United States Patent
Uenoyama et al.

(10) Patent No.: US 11,971,643 B2
(45) Date of Patent: Apr. 30, 2024

(54) REFLECTIVE DYNAMIC METASURFACE

(71) Applicant: HAMAMATSU PHOTONICS K.K., Hamamatsu (JP)

(72) Inventors: Soh Uenoyama, Hamamatsu (JP); Kazuyoshi Hirose, Hamamatsu (JP); Yoshitaka Kurosaka, Hamamatsu (JP); Hiroshi Tanaka, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 672 days.

(21) Appl. No.: 17/053,130

(22) PCT Filed: May 14, 2019

(86) PCT No.: PCT/JP2019/019131
§ 371 (c)(1),
(2) Date: Nov. 5, 2020

(87) PCT Pub. No.: WO2019/221120
PCT Pub. Date: Nov. 21, 2019

(65) Prior Publication Data
US 2021/0240052 A1  Aug. 5, 2021

(30) Foreign Application Priority Data
May 15, 2018  (JP) ................................. 2018-093546

(51) Int. Cl.
*G02F 1/29*  (2006.01)
*G02B 1/00*  (2006.01)
(Continued)

(52) U.S. Cl.
CPC ............. *G02F 1/292* (2013.01); *G02B 1/002* (2013.01); *G02F 1/01* (2013.01); *G02F 1/0121* (2013.01);
(Continued)

(58) Field of Classification Search
CPC ........ G02F 1/292; G02F 1/295; G02F 1/2955; G02F 1/29; G02F 1/01; G02F 1/0121;
(Continued)

(56) References Cited

U.S. PATENT DOCUMENTS

2009/0294906 A1  12/2009  Suzuki
2016/0274301 A1  9/2016  Mastro
(Continued)

FOREIGN PATENT DOCUMENTS

JP  2009-290027 A  12/2009
TW  201502640 A  1/2015
(Continued)

OTHER PUBLICATIONS

Huang, Yao-Wei et al., "Gate-Tunable Conducting Oxide Metasurfaces," Nano Letters, vol. 16, 2016, p. 5319-p. 5325.
(Continued)

*Primary Examiner* — Christopher Stanford
*Assistant Examiner* — Journey F Sumlar
(74) *Attorney, Agent, or Firm* — Faegre Drinker Biddle & Reath LLP

(57) ABSTRACT

A reflective dynamic metasurface of an embodiment comprises a structure enabling phase modulation in each of pixels constituting at least a one-dimensional array. The metasurface includes: a laminated structure body having a transparent conductive layer and a dielectric layer; a first metal film on one surface of the laminated structure body; a second metal film on the other surface of the laminated structure body; and a drive circuit controlling voltage applied between the first and second metal films. The first and second metal films are arranged to sandwich the pixels. The first metal film is arranged to expose a pair of window regions in one pixel, and the second metal film includes partial metal films defining the shape of each pixel and (Continued)

separated from each other. The drive circuit individually controls the potential of each partial metal film, thereby modulating the phase of the input light for each pixel.

18 Claims, 16 Drawing Sheets

(51) Int. Cl.
*G02F 1/01* (2006.01)
*G02F 1/19* (2019.01)
*G02F 1/295* (2006.01)
*G02F 1/355* (2006.01)

(52) U.S. Cl.
CPC .............. *G02F 1/19* (2013.01); *G02F 1/2955* (2013.01); *G02F 1/355* (2013.01); *G02F 2201/12* (2013.01); *G02F 2202/30* (2013.01); *G02F 2203/12* (2013.01); *G02F 2203/24* (2013.01)

(58) Field of Classification Search
CPC ... G02F 1/19; G02F 1/195; G02F 1/31; G02F 1/355; G02F 2202/30; G02F 2203/12; G02B 5/30; G02B 5/3008; G02B 5/3016; G02B 5/3025; G02B 5/3033; G02B 5/3041; G02B 6/00
See application file for complete search history.

(56) References Cited

U.S. PATENT DOCUMENTS

| | | | |
|---|---|---|---|
| 2016/0380405 A1* | 12/2016 | Takiguchi | G02F 1/29 372/26 |
| 2017/0090221 A1 | 3/2017 | Atwater | |
| 2017/0153527 A1* | 6/2017 | Kim | G02F 1/29 |
| 2017/0176651 A1 | 6/2017 | Lee et al. | |
| 2018/0024412 A1* | 1/2018 | Kim | G02F 1/292 359/315 |
| 2018/0062341 A1* | 3/2018 | Kim | H01S 5/0071 |

FOREIGN PATENT DOCUMENTS

| | | |
|---|---|---|
| WO | WO-2016/013466 A1 | 1/2016 |
| WO | WO-2017/217168 A1 | 12/2017 |

OTHER PUBLICATIONS

International Preliminary Report on Patentability dated Nov. 26, 2020 for PCT/JP2019/019131.

* cited by examiner (b)

(a)

(b)

(b)

REFLECTIVE DYNAMIC METASURFACE

TECHNICAL FIELD

The present invention relates to a reflective dynamic metasurface.

BACKGROUND ART

In recent years, metasurfaces have attracted attention as a structure capable of arbitrarily controlling the phase, intensity, or polarization of light. Unlike an optical element such as a conventional lens, the metasurface can control the phase of input light and the like by an extremely thin surface structure formed on a flat surface. For example, Non Patent Literature 1 discloses a technology related to a reflective metasurface, and the metasurface includes a mirror layer made of gold (Au), an ITO layer provided on the mirror layer, an $Al_2O_3$ layer provided on the ITO layer, and a nano antenna made of gold (Au) provided on the $Al_2O_3$ layer. Then, Non Patent Literature 1 describes that by setting a bias between the mirror layer and the nano antenna, the phase of input light can be modulated according to the setting pattern (optical phase) of the bias.

CITATION LIST

Non Patent Literature

Non Patent Literature 1: Yao-Wei, Huang et al., "Gate-tunable conducting oxide metasurfaces", Nano Letters, Vol. 16, pp. 5319-5325 (2016)

SUMMARY OF INVENTION

Technical Problem

The inventors have found the following problems as a result of examining the above-described conventional technology. That is, a metal-insulator-metal (MIM) type metasurface includes a lower metal film as a reflective film, a dielectric layer provided on the lower metal film, and an upper metal film provided on the dielectric layer. The width of the upper metal film and the thickness of the dielectric layer are sufficiently smaller than the wavelength of input light. Light is inputted into the dielectric layer from exposed regions located on both sides of the upper metal film of the surface of the dielectric layer. The light inputted to the dielectric layer is reflected on the lower metal film and then outputted from the surface of the dielectric layer to the outside of the metasurface. At this time, the phase of the input light changes according to the width of the upper metal film. Such a structure is called a static metasurface.

On the other hand, the metasurface of Non Patent Literature 1 has a structure in which the width of the upper metal film is set to be constant and a transparent conductive layer such as ITO is added to the structure described above, and a bias is set between the lower metal film and the upper metal film. In a state where the bias is set, metallization (state where the electron density becomes concentratively high near the interface between the dielectric layer and the transparent conductive layer) of a part of the transparent conductive layer occurs due to an electric field between the lower metal film and the upper metal film. At this time, the effective refractive index between the lower metal film and the upper metal film changes according to the thickness of the metallized layer (thickness of the part where the electron density becomes concentratively high). At this time, the phase of the input light changes according to the thickness of the metallized layer. The metasurface of Non Patent Literature 1 described above can control the phase of light by arbitrarily changing the applied voltage. Such a structure is called a dynamic metasurface.

However, the conventional technology described above has no concept of "pixel" (minimum unit to be controlled) for phase modulation, and precise phase adjustment, such as local adjustment in an arbitrary region in a two-dimensional pixel array, for example, has been difficult.

The present disclosure has been made to solve the above problems, and an object of the present disclosure is to provide a reflective dynamic metasurface including a structure for ensuring the degree of freedom of arrangement design of a plurality of pixels constituting a one-dimensional array or a two-dimensional array as a structure for enabling various applications, and for enabling control of phase modulation individually in each of the plurality of pixels.

Solution to Problem

The reflective dynamic metasurface according to an embodiment of the present disclosure comprises, as one aspect thereof, a laminated structure body, a first metal film, a second metal film, and a drive circuit. The laminated structure body includes a first surface, a second surface, a transparent conductive layer, and a dielectric layer. The first surface is a surface through which light of a predetermined wavelength can pass in both directions. The second surface is a surface opposing the first surface. The transparent conductive layer has transmittivity to the light and is arranged between the first surface and the second surface. The dielectric layer has transmittivity to the light and is arranged between the first surface and the second surface. A pixel region is set in the laminated structure body, a pixel region including at least a plurality of pixels constituting a one-dimensional array when the first surface is viewed along a lamination direction from the first surface to the second surface is set. The first metal film is disposed on the first surface of the laminated structure body. The second metal film is disposed on the second surface of the laminated structure body so as to sandwich the plurality of pixels together with the first metal film. The second metal film reflects, towards the first surface, the light passing through the first surface. The drive circuit controls the voltage applied between the first metal film and the second metal film.

The first metal film is disposed on the first surface so that a pair of window regions are exposed in each of the plurality of pixels when the first surface is viewed along the lamination direction. It is to be noted that the pair of window regions are arranged in a state of being separated from each other in a state of sandwiching at least a part of the first metal film. At least the second metal film includes a plurality of partial metal films disposed on the second surface. Each of the plurality of partial metal films defines the barycentric position and shape of the associated pixel of the plurality of pixels on the second surface. The plurality of partial metal films disposed on the second surface are separated from each other by a predetermined distance and are electrically separated from each other. The drive circuit has at least a structure in which the potentials of the plurality of partial metal films corresponding one-to-one to the plurality of pixels are individually controlled. This allows the phase of the light to be modulated for each of the plurality of pixels.

Advantageous Effects of Invention

According to an embodiment of the present disclosure, it is possible to provide a reflective dynamic metasurface capable of phase modulation in each of a plurality of pixels constituting a one-dimensional array or a two-dimensional array. Therefore, an embodiment of the present disclosure can realize a structure extremely thinner than, for example, a conventional diffractive optical element (DOE), and can contribute to miniaturization of the device. An embodiment of the present disclosure has advantages such as excellence in high speed (operation in the MHz order), as compared with, for example, a conventional liquid crystal type spatial light modulator (SLM).

DESCRIPTION OF EMBODIMENTS

[Description of Embodiments of Present Disclosure]

Figure 1:
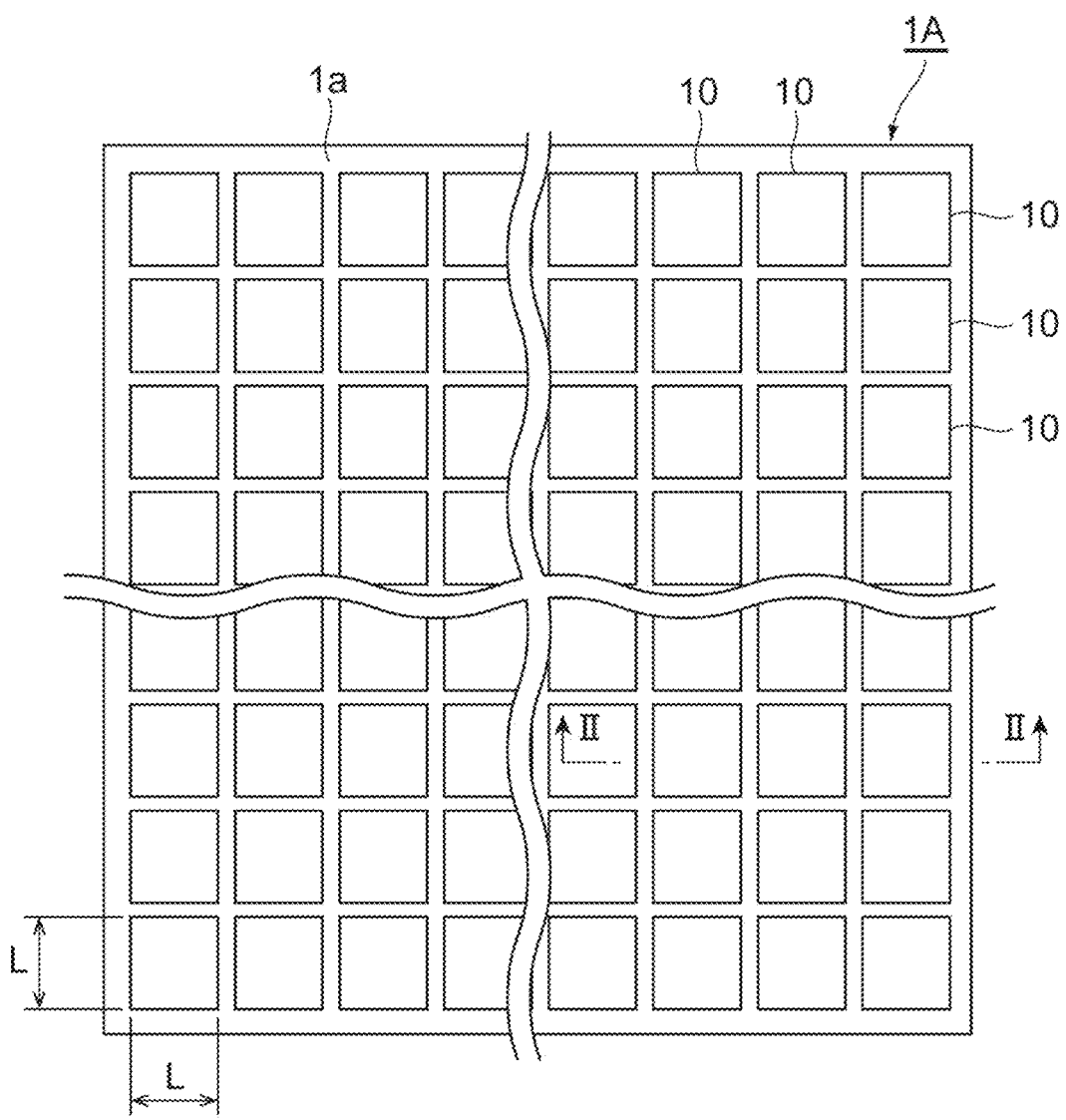
FIG. 1 is a plan view showing a metasurface 1A according to a first embodiment of the present disclosure.
Figure 1:
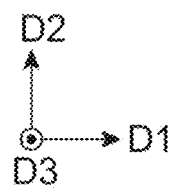

First, contents of the embodiments of the present disclosure will be individually listed and described.

(1) The reflective dynamic metasurface according to the present disclosure comprises, as one aspect thereof, a laminated structure body, a first metal film, a second metal film, and a drive circuit. The laminated structure body includes a first surface, a second surface, a transparent conductive layer, and a dielectric layer. The first surface is a surface through which light of a predetermined wavelength can pass in both directions. The second surface is a surface opposing the first surface. The transparent conductive layer has transmittivity to the light and is arranged between the first surface and the second surface. The dielectric layer has transmittivity to the light and is arranged between the first surface and the second surface. A pixel region is set in the laminated structure body, the pixel region including at least a plurality of pixels constituting a one-dimensional array when the first surface is viewed along a lamination direction from the first surface to the second surface. The first metal film is disposed on the first surface of the laminated structure body. The second metal film is disposed on the second surface of the laminated structure body so as to sandwich the plurality of pixels together with the first metal film. The second metal film reflects, towards the first surface, the light passing through the first surface. The drive circuit controls the voltage applied between the first metal film and the second metal film.

The first metal film is disposed on the first surface so that a pair of window regions are exposed in each of the plurality of pixels when the first surface is viewed along the lamination direction. It is to be noted that the pair of window regions are arranged in a state of being separated from each other in a state of sandwiching at least a part of the first metal film. At least the second metal film includes a plurality of partial metal films disposed on the second surface. Each of the plurality of partial metal films defines the barycentric position and shape of the associated pixel of the plurality of pixels on the second surface. The plurality of partial metal films disposed on the second surface are separated from each other by a predetermined distance and are electrically separated from each other. The drive circuit has a structure in which the potentials of at least the plurality of partial metal films corresponding one-to-one to the plurality of pixels are individually controlled. This allows the phase of the light to be modulated for each of the plurality of pixels. In particular, it becomes possible for the drive circuit to sequentially set the voltage for each pixel by adopting an active matrix method, which enables both voltage holding and switching for each pixel. Furthermore, it becomes also possible to switch a limited control state for an arbitrarily selected pixel group at an arbitrary timing.

The "pixel region" set in the laminated structure body means a region in which a plurality of pixels are set or can be set, and the plurality of pixels set in the pixel region may be arranged in a matrix when the laminated structure body is viewed along the lamination direction described above. In this case, the one-dimensional array (array constitute with a plurality of pixels) constitutes a part of a matrix array (two-dimensional array).

A pair of window regions are set for each pixel in the laminated structure body in the reflective dynamic metasurface. The pair of window regions are located so as to sandwich at least a part of the first metal film when viewed from the lamination direction. In this case, the light inputted to one of the pair of window regions is reflected on the second metal film, and outputted from the other of the pair of window regions to the outside of the reflective dynamic metasurface. In the case where the width of the first metal film and the thickness of the laminated structure body are sufficiently smaller than the wavelength of light, a gap surface plasmon mode (localized plasmon excitation) occurs in the laminated structure body when a drive voltage is applied between the first metal film and the second metal film. The gap surface plasmon mode is an electromagnetic wave mode in which the electromagnetic field is strongly localized in a gap between substances, thereby causing induced currents in opposite orientations to each other in each of the first metal film and the second metal film. Generation of induced currents in opposite orientations to each other in each of the first metal film and the second metal film causes strong magnetic resonance (plasmon resonance) in the laminated structure body. Due to magnetic resonance, the phase of the light passing through between the first metal film and the second metal film is modulated. Here, when a drive voltage is applied between the first metal film and the second metal film, the electron density near the interface of the transparent conductive layer with the dielectric layer increases. The state in which the electron density thus becomes higher is described as "metallization" herein. Due to metallization of a portion of the transparent conductive layer near the interface, the effective refractive index of the laminated structure body changes. The modulation amount in the phase modulation described above depends on the effective refractive index of the laminated structure body. Therefore, by changing the drive voltage, the effective refractive index is controlled, and as a result, the phase of output light can be controlled.

In the reflective dynamic metasurface, the drive circuit has the structure in which the potentials of at least the plurality of partial metal films corresponding one-to-one to the plurality of pixels are individually controlled. It is to be noted that "individual control" with respect to the partial metal film included in the second metal film includes control of matching the potentials of all the partial metal films included in the second metal film as a result, or the potentials of one or more arbitrarily selected partial metal films. Various potential setting states are assumed depending on the structure of the first metal film. For example, as a first potential setting state, in a configuration in which the first metal film is disposed across a plurality of pixels, by setting the first metal film to the reference potential, the first surface side potentials of the plurality of pixels match together. On the other hand, by individually controlling the potentials of the partial metal films included in the second metal film, the second surface side potentials of the plurality of pixels can be set to different potentials for each pixel. As a second potential setting state, even if the first metal film is configured to include partial metal films corresponding one-to-one to the plurality of pixels, when the potentials of the partial metal films included in the first metal film are individually set to the reference potential, the first surface side potentials of the plurality of pixels are brought into a state of matching. At this time, by individually controlling the potentials of the partial metal films included in the second metal film, the second surface side potentials of the plurality of pixels can be set to different potentials for each pixel. As a third potential setting state, in a configuration in which the first metal film includes partial metal films corresponding one-to-one to the plurality of pixels, by individually setting the potentials of the partial metal films included in the first metal film, the first surface side potentials of the plurality of pixels may be set to different potentials for each pixel. Similarly, by also individually controlling the potentials of the partial metal films included in the second metal film, the second surface side potentials of the plurality of pixels can be set to different potentials for each pixel. As a fourth potential setting state, in a configuration in which the first metal film includes partial metal films corresponding one-to-one to the plurality of pixels, by individually setting the potentials of the partial metal films included in the first metal film, the first surface side potentials of the plurality of pixels may be set to different potentials for each pixel. On the other hand, by individually controlling the potentials of the partial metal films included in the second metal film so that the potentials become the reference potential, the second surface side potentials can be set to the reference potential in all of the plurality of pixels. In any of the potential setting states described above, phase modulation independent for each pixel becomes possible. Therefore, according to the reflective dynamic metasurface, it becomes possible to modulate the phase of light input for each of the plurality of pixels constituting a one-dimensional array or a two-dimensional array.

(2) As one aspect of the present disclosure, the drive circuit preferably includes a plurality of voltage holding portions disposed so as to correspond one-to-one to the plurality of partial metal films. The plurality of voltage holding portions each hold the voltage for setting the potential of the associated partial metal film of the plurality of partial metal films. Furthermore, as one aspect of the present disclosure, the drive circuit may include a plurality of transistors disposed so as to correspond one-to-one to the plurality of pixels. In this case, the sequential voltage setting becomes possible for each partial metal film with a simplified circuit configuration (active matrix method). Furthermore, it becomes also possible to set a limited voltage for one or more arbitrarily selected partial metal films at an arbitrary timing. As one aspect of the present embodiment, each of the plurality of voltage holding portions preferably includes a capacitor in which one electrode is constituted with the associated partial metal film of the plurality of partial metal films. In this case, the voltage holding portion can be realized by a simple configuration.

(3) As one aspect of the present disclosure, the laminated structure body may have a gap or an insulation portion arranged between pixels adjacent to each other of the plurality of pixels. The gap or the insulation portion electrically separates, from each other, adjacent portions each constituting a part of the transparent conductive layer and each constituting a part of the adjacent pixel. In this case, it is possible to reduce crosstalk between pixels adjacent to each other.

(4) As one aspect of the present disclosure, the array direction of the pair of window regions on the first surfaces preferably coincides with the polarization direction of the light to be input. In this case, it is possible to effectively control the phase of the light to be input.

(5) As one aspect of the present disclosure, the dielectric layer is preferably located between the first surface and the transparent conductive layer.

(6) As one aspect of the present disclosure, the reflective dynamic metasurface further includes a substrate having a main surface on which the drive circuit is arranged, and the substrate is integrated with the laminated structure body in a state where the main surface and the second surface of the laminated structure body face each other. In this case, a small-sized reflective dynamic metasurface with an incorporated drive circuit can be provided.

(7) As one aspect of the present disclosure, the drive circuit may set the first metal film to the reference potential, and the first metal film may have a structure of extending over two or more pixels arranged side by side along a direction intersecting with the array direction of the pair of window regions. In this case, the reference potential can be easily provided to the first metal film.

(8) As one aspect of the present disclosure, the dielectric layer preferably contains at least one of aluminum oxide, silicon oxide, and magnesium fluoride. In this case, the dielectric layer described above can be preferably realized.

(9) As one aspect of the present disclosure, the transparent conductive layer preferably includes at least one of indium oxide and zinc oxide as an oxide whose resistance is reduced by a dopant. In this case, the operation of the transparent conductive layer described above can be preferably realized.

Thus, each aspect listed in this [Description of Embodiments of Present Disclosure] column is applicable to each of all remaining aspects or to all combinations of these remaining aspects.

[Details of Embodiments of Present Disclosure]

Hereinafter, a specific structure of the embodiments of the present disclosure will be described in detail with reference to the accompanying drawings. It is to be noted that the present invention is not limited to these examples, but is shown by the claims, and is intended to include all variations within the meaning and scope equivalent of the claims. In addition, in the description of the drawings, identical elements are given identical reference numerals and redundant description is omitted.

First Embodiment

FIG. 1 is a plan view showing a reflective dynamic metasurface (hereinafter, simply referred to as "metasurface") 1A according to the first embodiment of the present disclosure. The "metasurface" is a device that changes the phase, intensity, or polarization of incident light for each unit structure by forming a plurality of unit structures sufficiently smaller than the wavelength of light on a flat surface. There are various structures of metasurfaces, and the metasurface according to an embodiment of the present disclosure has a structure called a gap plasmon type. A metasurface 1A is a flat plate-shaped device extending along directions D1 and D2 intersecting (e.g., orthogonal) with each other, and a direction D3 intersecting (e.g., orthogonal) with both of the directions D1 and D2 is a thickness direction. A plurality of pixels 10 are set on a main surface 1a of the metasurface 1A. The plurality of pixels 10 constitute a matrix in M rows and N columns (M and N are integers equal to or greater than 2) with the direction D1 as the row direction and the direction D2 direction as the column direction (two-dimensional array). The planar shape of each pixel 10 is a quadrilateral (e.g., square). A length L of one side of each pixel 10 falls within the range of 200 to 400 nm, for example. The metasurface 1A is used for various purposes such as lens application and hologram formation by individually modulating the phase of the light inputted to the main surface 1a for each pixel 10.

Figure 2:
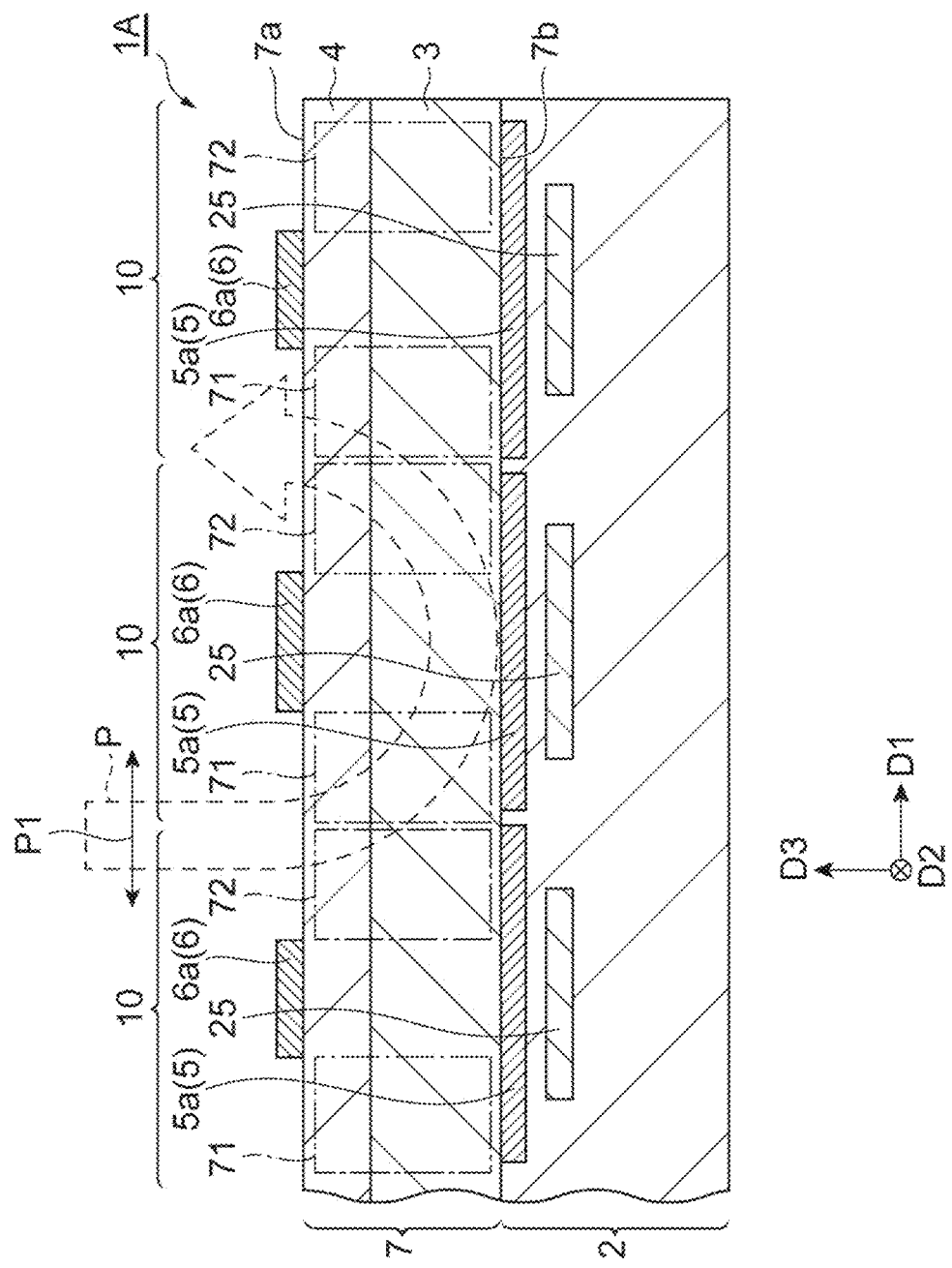
FIG. 2 is a cross-sectional view taken along a line II-II shown in FIG. 1.

FIG. 2 is a cross-sectional view taken along a line II-II shown in FIG. 1, and shows a cross-sectional structure of the metasurface 1A. As shown in FIG. 2, the metasurface 1A includes a drive circuit 2, a metal film (second metal film) 5 provided on the surface of the drive circuit 2, and a laminated structure body 7 laminated on the metal film 5, and a metal film (first metal film) 6 provided on the laminated structure body 7. That is, the laminated structure body 7 is provided between the metal film 5 and the metal film 6.

The laminated structure body 7 is a flat film and extends along both the directions D1 and D2 over the plurality of pixels 10. The laminated structure body 7 has a main surface (first surface) 7a and a back surface (second surface) 7b. Modulated light P is inputted to the main surface 7a. The modulated light P is, for example, laser light, which is light having the linear polarization property. A wavelength λ of the modulated light P falls within the range of 400 to 1600 nm, and is 850 nm in one example. The main surface 7a and the back surface 7b face each other along the direction D3. The distance between the main surface 7a and the back surface 7b (i.e., the thickness of the laminated structure body 7 along the direction D3) is set sufficiently smaller than the wavelength λ of the modulated light P. The thickness of the laminated structure body 7 falls within the range of 10 to 100 nm, for example. The laminated structure body 7 has a transparent conductive layer 3 and a dielectric layer 4 laminated with the direction D3 as the lamination direction.

The transparent conductive layer 3 is an inorganic film having transmittivity (light transmittivity) with respect to input light and also having conductivity. The "light transmittivity" refers to a property in which absorption with respect to a wavelength of light inputted to the metasurface 1A is extremely low (e.g., light absorption is equal to or less than 20%). In addition, the "conductivity" refers to a property in which the electrical resistivity is extremely low (e.g., property in which the resistivity is equal to or less than $10^{-6}$ Ω·m). The transparent conductive layer 3 of the present embodiment includes at least one of indium oxide ($In_2O_3$) and zinc oxide ($Zn_2O_3$) whose resistance is reduced by a dopant. The dopant for indium oxide is Sn, for example. Indium oxide doped with Sn is called ITO. The dopant for zinc oxide is Al or Ga, for example. Zinc oxide doped with Al is called AZO. Zinc oxide doped with Ga is called GZO. The thickness of the transparent conductive layer 3 falls within the range of 3 to 50 nm, for example, and is 20 nm in one example.

The dielectric layer 4 is an inorganic film having transmittivity (light transmittivity) with respect to input light and also having insulation property. The "insulation property" refers to a property in which the electrical resistivity is extremely high (e.g., property in which the resistivity is equal to or greater than $10^{-6}$ Ω·m). The dielectric layer 4 contains at least one of aluminum oxide ($Al_2O_3$), silicon oxide ($SiO_2$), and magnesium fluoride ($MgF_2$), for example. The thickness of the dielectric layer 4 falls within the range of 1 to 20 nm, for example, and is 5 nm in one example. In the present embodiment, the dielectric layer 4 is located on the main surface 7a side with respect to the transparent conductive layer 3.

It is to be noted that while in the present embodiment, the transparent conductive layer 3 is provided on the back surface 7b side and the dielectric layer 4 is provided on the main surface 7a side, the transparent conductive layer 3 may be provided on the main surface 7a side and the dielectric layer 4 may be provided on the back surface 7b side. While in the present embodiment, one surface of the transparent conductive layer 3 constitutes the back surface 7b and one surface of the dielectric layer 4 constitutes the main surface 7a, another layer may be further provided at least any of between the main surface 7a and a film structure comprising the transparent conductive layer 3 and the dielectric layer 4, between the film structure and the back surface 7b, and between the transparent conductive layer 3 and the dielectric layer 4.

Figure 3:
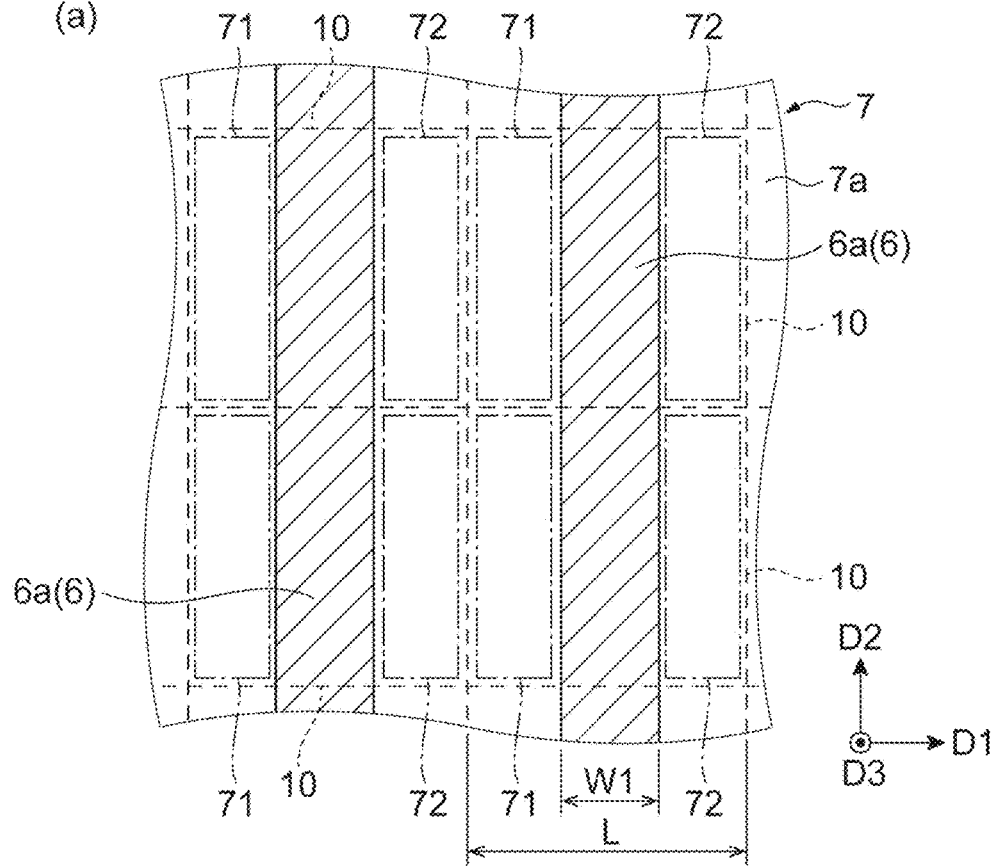
FIG. 3A is a view showing a planar shape of a metal film 6.
FIG. 3B is a view showing a planar shape of a metal film 5.
Figure 3:
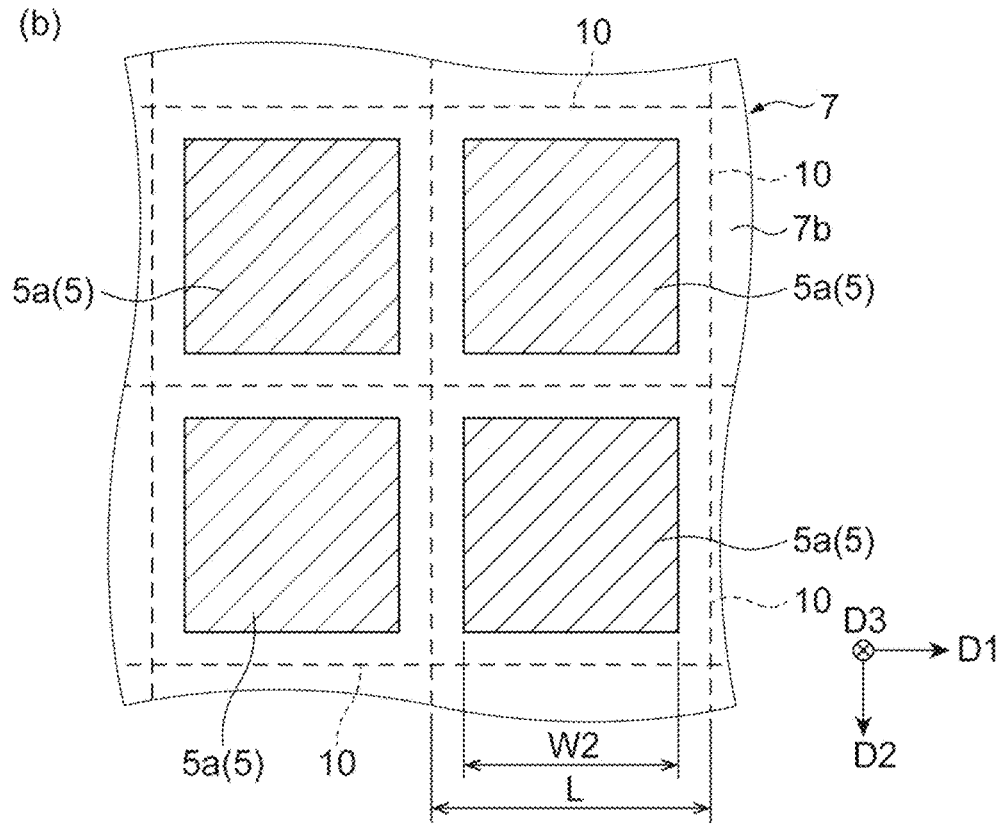

The metal film 6 is the first metal film in the present embodiment and has a function as a nano antenna in the metasurface structure. The metal film 6 is provided on the main surface 7a of the laminated structure body 7. The metal film 6 is a film made of a metal such as gold (Au). The film thickness of the metal film 6 falls within the range of 30 to 100 nm, for example, and 50 nm in one example. The metal film 6 includes a plurality of partial metal films 6a. FIG. 3A is a view showing the planar shape of the metal film 6. As shown in FIG. 3A, the plurality of partial metal films 6a are arranged side by side along the direction D1 and are separated from each other. Each partial metal film 6a is provided for each column of the pixels 10 and extends over the two or more pixels 10 (M pixels 10 in the present embodiment) arranged side by side along the direction D2. A width W1 of the partial metal film 6a defined along the direction D1 is set smaller than the length L of the pixel 10 defined along the direction D1, and is set sufficiently smaller than the wavelength λ of the modulated light P. In one example, the width W1 of the partial metal film 6a falls within the range of 40 to 360 nm, and is 250 nm in one example. The distance between the adjacent partial metal films 6a falls within the range of 40 to 360 nm, and is 150 nm in one example. The ratio (W1/λ) between the width W1 of the partial metal film 6a and the wavelength λ of the modulated light P falls within the range of 0.02 to 1. Furthermore, the ratio (W1/L) between the width W1 of the partial metal film 6a and the length L of one side of the pixel 10 falls within the range of 0.1 to 0.9.

As described above, the width W1 of the partial metal film 6a is smaller than the length L of the pixel 10. Then, the partial metal film 6a is arranged at the substantially center portion of the pixel 10 along the direction D1. Therefore, as shown in FIGS. 2 and 3A, the laminated structure body 7 includes a pair of window regions 71 and 72 in each pixel 10. The pair of window regions 71 and 72 are each exposed so as to sandwich a part of the partial metal film 6a when the main surface 7a is viewed along the direction D3. As shown in FIG. 2, the array direction (i.e., the direction D1) of the pair of window regions 71 and 72 coincides with a polarization direction P1 of the modulated light P.

The metal film 5 is the second metal film in the present embodiment. The metal film 5 is provided on the back surface 7b of the laminated structure body 7. In one example, the metal film 5 is in contact with the back surface 7b. The metal film 5 reflects, towards the main surface 7a, the modulated light P inputted to the laminated structure body 7. The metal film 5 is made of a metal such as gold (Au). The film thickness of the metal film 5 falls within the range of 100 to 200 nm, for example, and 150 nm in one example. The metal film 5 includes a plurality of partial metal films 5a. FIG. 3B is a view showing the planar shape of the metal film 5. The plurality of partial metal films 5a are arrayed (two-dimensional array) in a matrix of M rows and N columns in which the direction D1 is the row direction and the direction D2 is the column direction, and are separated from one another. Each partial metal film 5a is provided for each pixel 10 and defines the barycentric position and shape of each pixel 10. In one example, the planar shape of each partial metal film 5a is a quadrilateral (e.g., square), and is located in the pixel 10. In one example, a length W2 of one side of the partial metal film 5a falls within the range of 40 to 360 nm. Furthermore, the ratio (W2/L) between the length W2 of one side of the partial metal film 5a and the length L of one side of the pixel 10 falls within the range of 0.1 to 0.9.

The drive circuit 2 includes a substrate having a plurality of transistors 25. The drive circuit 2 controls the voltage applied between the metal film 5 and the metal film 6 from the outside of the metasurface 1A. More specifically, the drive circuit 2 sets the potentials of the plurality of partial metal films 6a to a common reference potential (GND potential), and individually controls the voltages of the plurality of partial metal films 5a by using the transistors 25. The drive circuit 2 is located on the back surface 7b side with respect to the laminated structure body 7. Each transistor 25 is provided so as to correspond one-to-one to each pixel 10, and is located in each pixel 10 when the main surface 7a is viewed along the direction D3. The transistor 25 is a thin film transistor provided on a substrate made of a dielectric, for example. The partial metal film 5a is provided on each transistor 25 via an insulation film.

Figure 4:
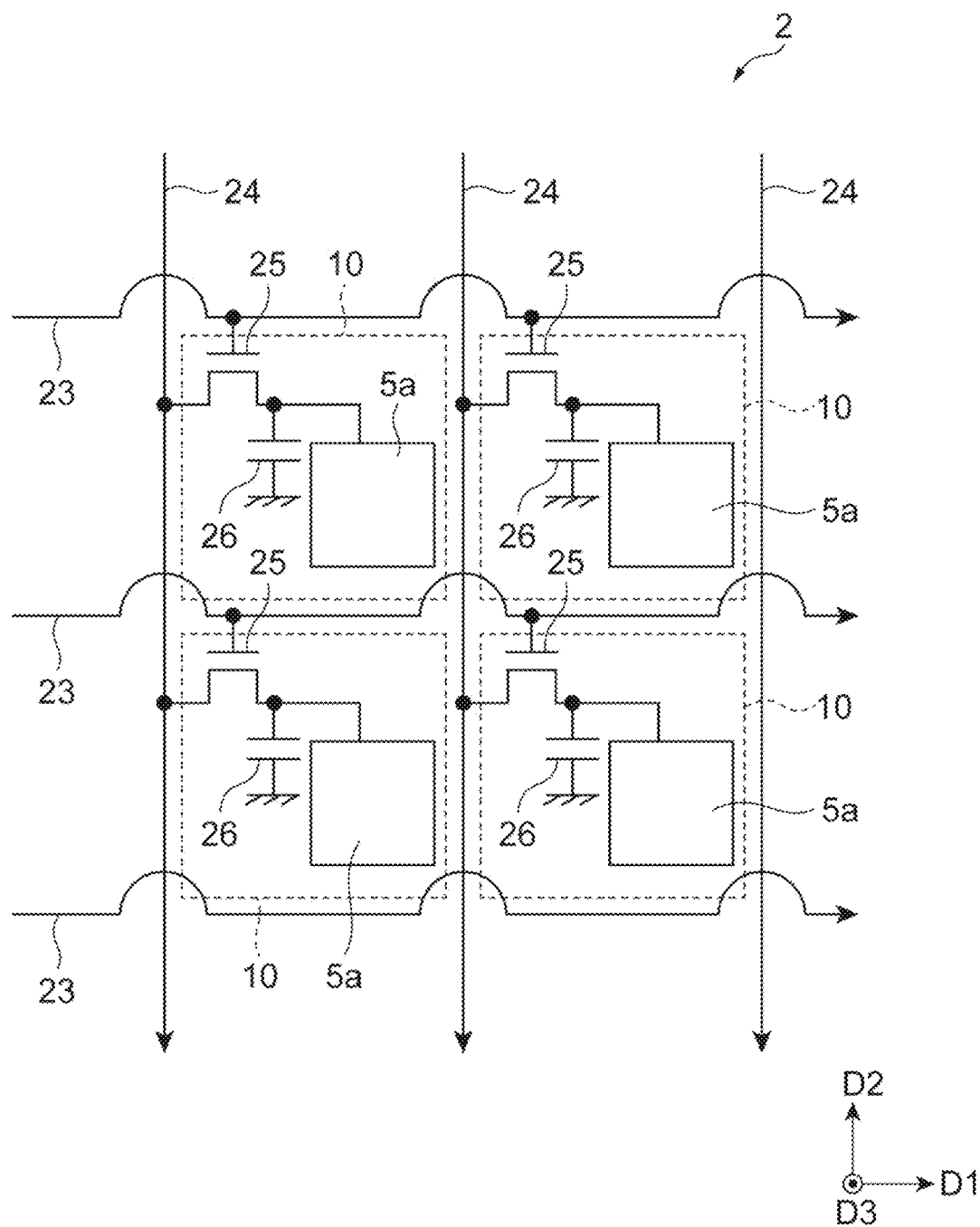
FIG. 4 is a view showing a circuit configuration of a drive circuit corresponding to each pixel 10.

FIG. 4 is a view showing the circuit configuration of a drive circuit 2 corresponding to each pixel 10. As shown in FIG. 4, the drive circuit 2 further has M gate drive wirings 23 and N voltage supply wirings 24. The M gate drive wirings 23 each extend along the row direction (i.e., the direction D1) and are arranged side by side along the column direction (i.e., the direction D2) with each other. The N voltage supply wirings 24 each extend along the column direction (i.e., the direction D2) and are arranged side by side along the row direction (i.e., the direction D1) with each other. The gate drive wiring 23 of the m-th row (m=1, 2, ..., M) is electrically connected with a control terminal (gate) of the transistor 25 provided for each pixel 10 located in the m-th row. The voltage supply wiring 24 of the n-th column (n=1, 2, ..., N) is electrically connected with one current terminal (e.g., source) of the transistor 25 provided for each pixel 10 located in the n-th column. The other current terminal (e.g., drain) of the transistor 25 is electrically connected with the partial metal film 5a of the pixel 10 via the wiring in the pixel 10.

The drive circuit 2 of the present embodiment further has a plurality of capacitors 26 provided for each pixel 10. The capacitor 26 is an example of a voltage holding portion in the present embodiment, and holds, for each partial metal film 5a, a voltage applied to the partial metal film 5a of the pixel 10. It is to be noted that as the voltage holding portion, various configurations capable of holding a voltage other than the capacitor can be applied. The capacitor 26 is a parallel plate capacitor formed inside the drive circuit 2, for example. One electrode of the capacitor 26 is connected to the partial metal film 5a, and the other electrode is connected to a constant potential region (e.g., reference potential region). It is to be noted that as will be described later, the partial metal film 5a may also serve as one electrode of the capacitor 26.

Figure 5:
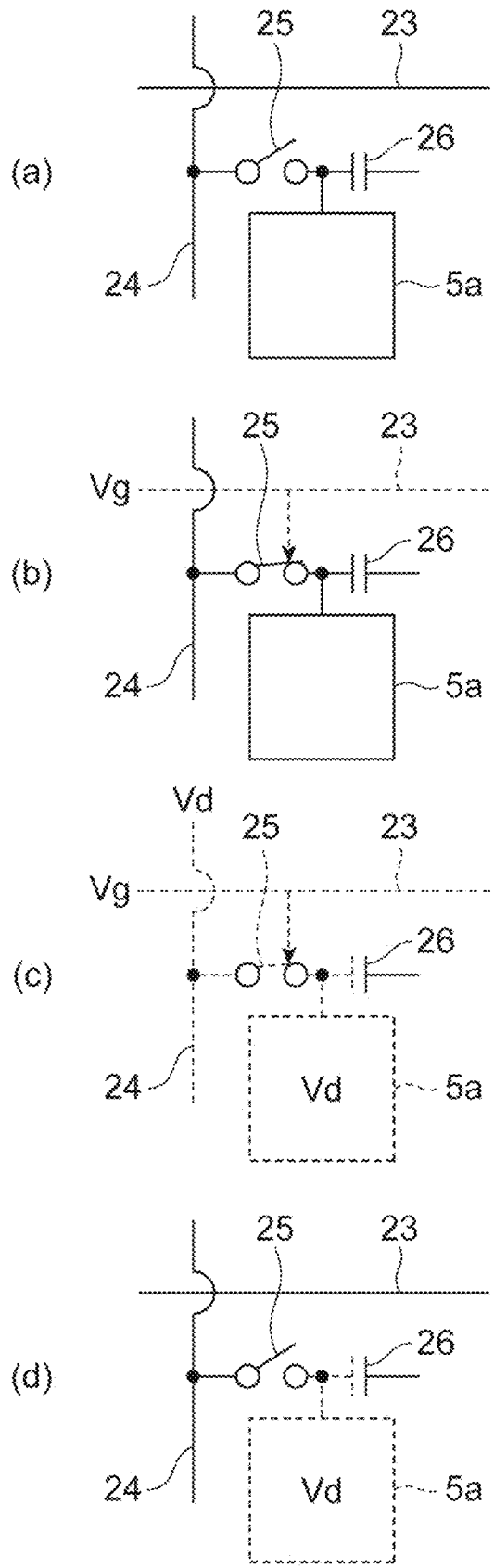
FIGS. 5A to 5D are views for explaining an operation of the drive circuit 2 in the pixel 10 of an m-th row and an n-th column.

FIGS. 5A to 5D are views for explaining the operation of the drive circuit 2 in the pixel 10 of an m-th row and an n-th column. In FIGS. 5A to 5D, portions having significant voltage values are indicated by broken lines. First, in the state shown in FIG. 5A, no voltage is applied to any of the gate drive wiring 23 in the m-th row and the voltage supply wiring 24 in the n-th column, and the transistor 25 is in a non-conductive state. Next, as shown in FIG. 5B, when a predetermined gate voltage Vg is applied to the gate drive wiring 23 of the m-th row, the transistor 25 is brought into a conductive state. At this time, the voltage supply wiring 24 of the n-th column and the partial metal film 5a are connected to each other via the transistor 25. Subsequently, as shown in FIG. 5C, a drive voltage Vd is applied to the voltage supply wiring 24 of the n-th column. The drive voltage Vd is independently set for each pixel 10 on the basis of a desired phase modulation pattern to be presented on the metasurface 1A. Thus, the drive voltage Vd is applied to the partial metal film 5a via the transistor 25, and at the same time, the drive voltage Vd is held by the capacitor 26. Thereafter, as shown in FIG. 5D, the gate voltage Vg is not applied from the gate drive wiring 23 of the m-th row, and the supply of the drive voltage Vd from the voltage supply wiring 24 of the n-th column is stopped. At this time, the transistor 25 is brought into a non-conductive state again, but the voltage at the partial metal film 5a is held to the drive voltage Vd by the capacitor 26. Such operation is sequentially performed for all the pixels 10, and the drive circuit 2 individually controls the potentials of the plurality of partial metal films 5a, whereby a desired phase modulation pattern is presented on the metasurface 1A and the phase of the modulated light P is modulated for each pixel 10. It is to be noted that it is also possible at an arbitrary timing to select an arbitrary pixel group and perform individual potential setting.

Figure 6:
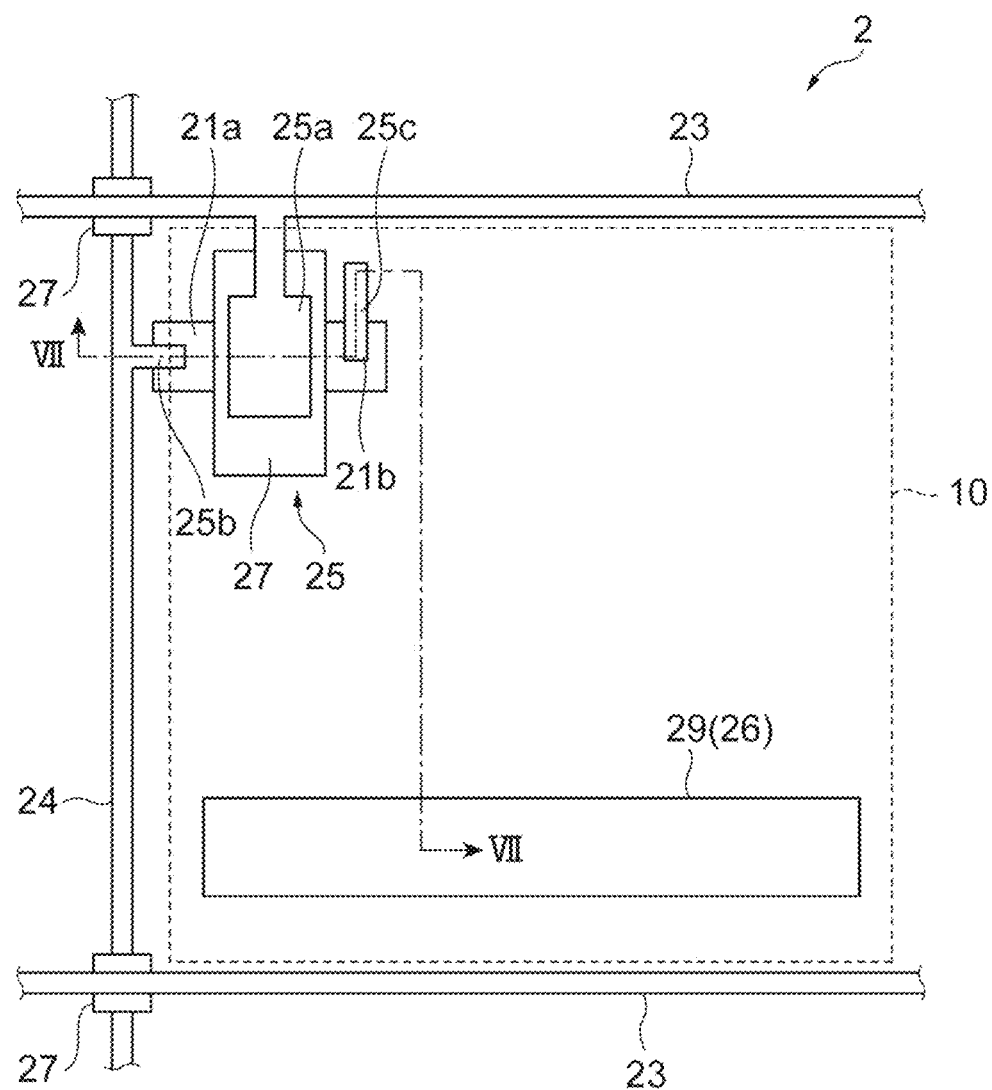
FIG. 6 is a plan view showing a structure of the drive circuit 2 in each pixel 10.
Figure 7:
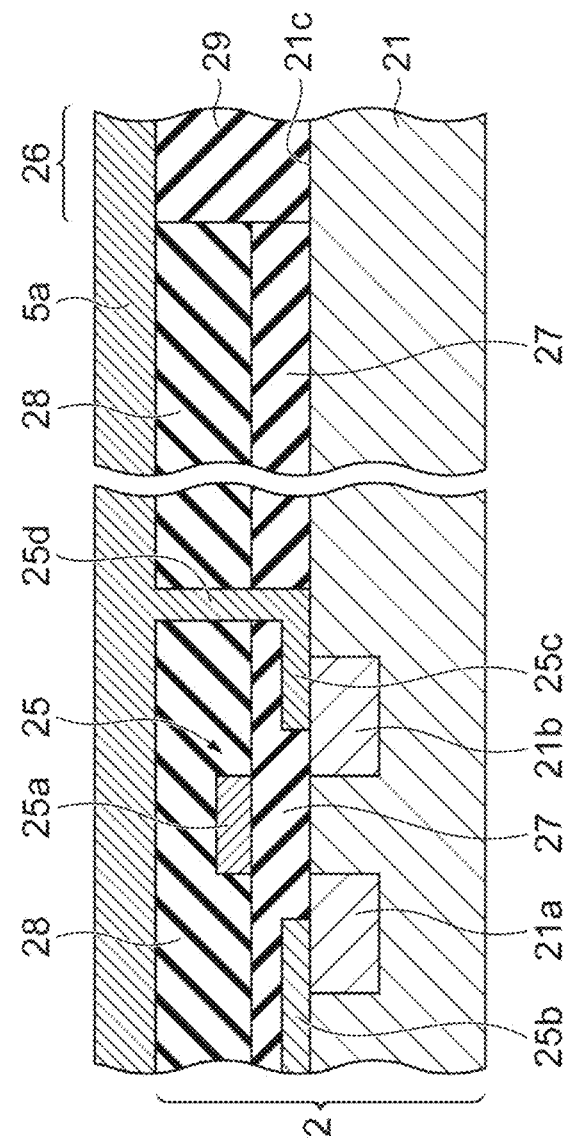
FIG. 7 is a cross-sectional view taken along a line VII-VII shown in FIG. 6.

FIG. 6 is a plan view showing the structure of the drive circuit 2 in each pixel 10. FIG. 7 is a cross-sectional view taken along a line VII-VII shown in FIG. 6, and shows a cross-sectional structure of the drive circuit 2 in each pixel 10. As shown in FIGS. 6 and 7, the drive circuit 2 has a semiconductor layer 21 of a first conductivity type (e.g., p type) and insulation layers 27 and 28 provided on the semiconductor layer 21. The semiconductor layer 21 may be a semiconductor substrate itself or may be a semiconductor film (a single crystal film, a polycrystalline film, or an amorphous film) formed on a dissimilar substrate. A surface 21c of the semiconductor layer 21 (i.e., the main surface of the semiconductor substrate or the main surface of the substrate-like member composed of a dissimilar substrate and a semiconductor film) is provided with the transistor 25. When the semiconductor layer 21 is a semiconductor film formed on a dissimilar substrate, the transistor 25 is called a thin film transistor. The semiconductor substrate constituting the semiconductor layer 21, or, the substrate-like member constituting the semiconductor layer 21 and composed of the dissimilar substrate and the semiconductor film is integrated with the laminated structure body 7 while causing the surface 21c and the back surface 7b of the laminated structure body 7 (see FIG. 2) to face each other.

As an example, the semiconductor layer 21 is mainly made of Si doped with an impurity of the first conductivity type (e.g., p type). In the semiconductor layer 21, semiconductor regions 21a and 21b of a second conductivity type (e.g., n type) are formed. The semiconductor regions 21a and 21b are mainly made of Si doped with an impurity of the second conductivity type. The semiconductor regions 21a and 21b are arranged with an interval from each other and exposed on the surface 21c of the semiconductor layer 21. The semiconductor region 21a is in ohmic contact with a source electrode 25b of the transistor 25 provided on the surface 21c. The semiconductor region 21b is in ohmic contact with a drain electrode 25c of the transistor 25 provided on the surface 21c. The source electrode 25b and the drain electrode 25c are arranged side by side with an interval on the surface 21c.

A region on the surface 21c except the source electrode 25b and the drain electrode 25c is covered with the insulation layer 27. It is to be noted that in FIG. 6, only necessary portions of the insulation layer 27 are shown for easy understanding. The insulation layer 27 mainly contains an insulating silicon compound such as $SiO_2$. A gate electrode 25a of the transistor 25 is provided on the insulation layer 27. The gate electrode 25a is opposite, across the insulation layer 27, to a region of the semiconductor layer 21 located between the semiconductor region 21a and the semiconductor region 21b. The gate electrode 25a is covered with the insulation layer 28 provided on the insulation layer 27. As shown in FIG. 7, the insulation layer 28 is a protective film that protects the entire drive circuit 2. The insulation layer 28 mainly contains $SiO_2$, for example. The partial metal film 5a of the pixel 10 is provided on the insulation layer 28.

As shown in FIG. 6, the source electrode 25b is connected to the voltage supply wiring 24 provided on the surface 21c. The gate electrode 25a is connected to the gate drive wiring 23 via a wiring provided on the insulation layer 27. As shown in FIG. 7, the drain electrode 25c is connected to the partial metal film 5a via a wiring 25d penetrating the insulation layers 27 and 28.

The capacitor 26 is composed of a part of the partial metal film 5a, the semiconductor layer 21 immediately below the partial metal film 5a, and a dielectric layer 29 interposed therebetween. It is to be noted that the semiconductor layer 21 is set to a constant potential (e.g., reference potential). In this case, the partial metal film 5a serves also as one electrode of the capacitor 26, and the semiconductor layer 21 serves also as the other electrode of the capacitor 26. The dielectric layer 29 is provided so as to embed the openings formed in the insulation layers 27 and 28. The lower surface of the dielectric layer 29 is in contact with the semiconductor layer 21, and the upper surface of the dielectric layer 29 is in contact with the partial metal film 5a. The dielectric layer 29 mainly contains $SiO_2$, for example.

Figure 8:
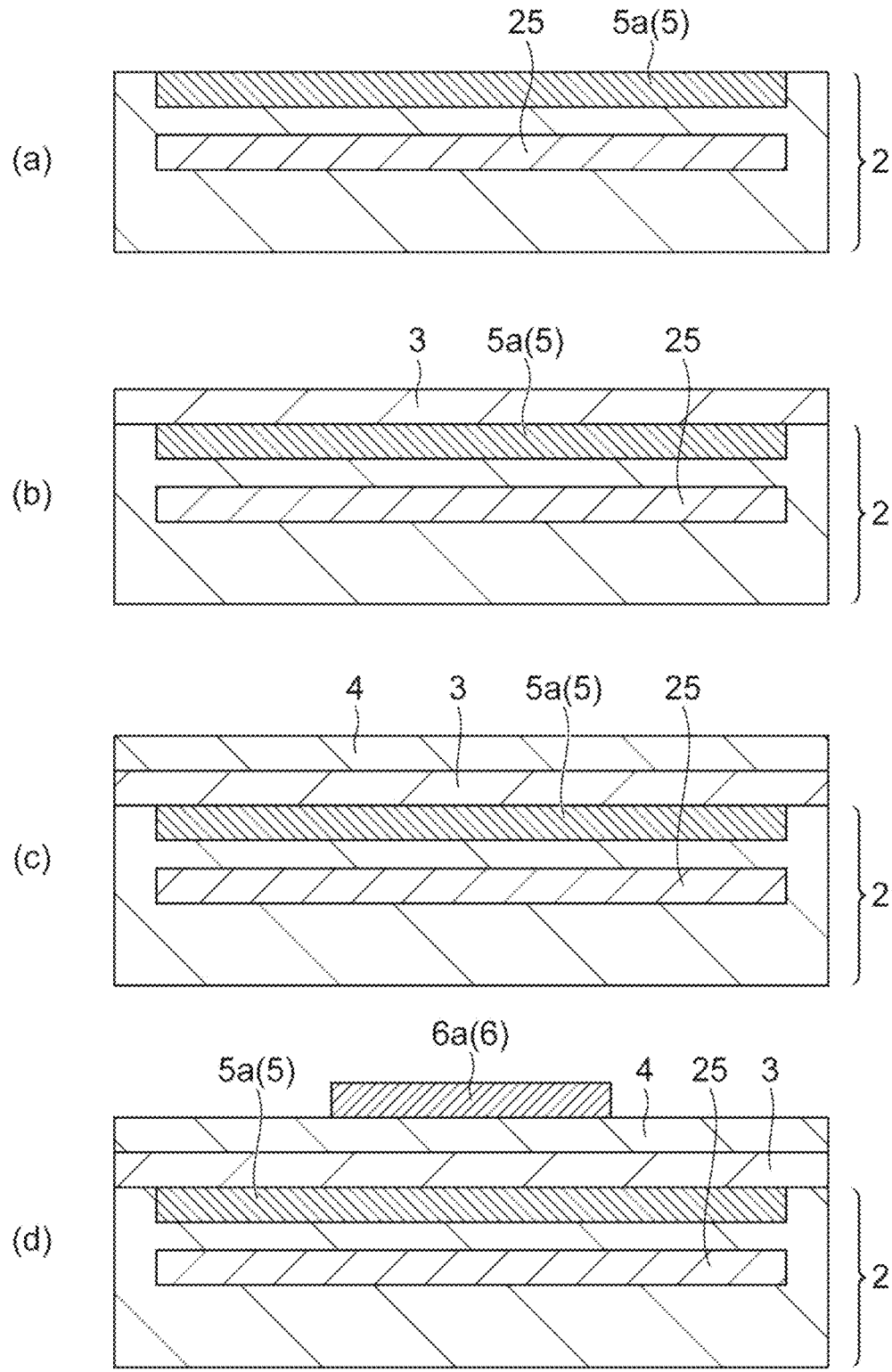
FIGS. 8A to 8D are cross-sectional views showing each step in one example of a production method of the metasurface 1A.

FIGS. 8A to 8D are cross-sectional views showing each step in one example of the production method of the metasurface 1A. It is to be noted that while FIGS. 8A to 8D show one pixel 10 as a representative, the other pixels 10 are also produced by the same method in parallel with the pixel 10. First, as shown in FIG. 8A, the drive circuit 2 is prepared as the first step. The drive circuit 2 is produced by a known method of forming a wiring layer on a substrate having a transistor. At this time, the metal film 5 including the plurality of partial metal films 5a is formed on the wiring layer on the drive circuit 2. Next, as shown in FIG. 8B, the transparent conductive layer 3 is formed on the metal film 5 by a physical vapor deposition method such as a sputtering method. Specifically, a target made of a material of the transparent conductive layer 3 is installed in a vacuum chamber, and an inert gas ionized by a high voltage is made to collide with the target, thereby scattering the material of the transparent conductive layer 3 (film formation). When the transparent conductive layer 3 is made of ITO, the material of the dielectric layer 4 is at least one of $SiO_2$, $Al_2O_3$, and $HfO_2$, for example. Subsequently, as shown in FIG. 8C, the dielectric layer 4 is formed on the transparent conductive layer 3 using, for example, an atomic layer deposition (ALD) method. Specifically, for each element constituting the dielectric layer 4, source gas is fed into and purged from a film formation apparatus, and formation of a film having a thickness of several angstroms, for example, is repeated. When the dielectric layer 4 is made of $SiO_2$, the material of ALD is, for example, TDMAS and oxygen plasma. Subsequently, as shown in FIG. 8D, the metal film 6 including the plurality of partial metal films 6a is formed on the dielectric layer 4 by using a lift-off method, for example. Specifically, first, a resist is applied onto the dielectric layer 4, and then a plurality of openings corresponding to the plurality of partial metal films 6a are formed. Next, a metal film (e.g., an Au film) is vapor-deposited on the entire surface of the dielectric layer 4 including the plurality of openings of the resist. Then, by removing the resist, the metal film deposited on the resist is removed. Through the above steps, the metasurface 1A of the present embodiment is produced.

Next, the effects of the metasurface 1A of the present embodiment obtained through the above production steps will be described. The metasurface 1A includes an MIM structure in which the metal film 5 as a light reflection film, the laminated structure body 7 including the transparent conductive layer 3 and the dielectric layer 4, and the metal film 6 composed of the plurality of partial metal films 6a having the finite width W1 are laminated in the presented order. In this case, as shown in FIGS. 2, 3A, and 3B, the laminated structure body 7 includes the pair of window regions 71 and 72. The pair of window regions 71 and 72 are each provided (exposed) so as to sandwich the partial metal film 6a when the main surface 7a is viewed from the lamination direction (direction D3). The modulated light P inputted from the outside of the metasurface 1A to one window region 71 (or 72) of the laminated structure body 7 is reflected on the metal film 5, and outputted from the other window region 72 (or 71) of the laminated structure body 7 to the outside of the metasurface 1A. At this time, when the drive voltage Vd is applied between the partial metal film 6a and the metal film 5, induced currents in opposite orientations to each other called a gap surface plasmon mode are generated in both the partial metal film 6a and the metal film 5, and strong magnetic resonance (plasmon resonance) is generated in the laminated structure body 7. Due to this magnetic resonance, the phase of the modulated light P passing through between the partial metal film 6a and the metal film 5 is modulated.

Here, the following Expression (1) expresses the relationship of a phase modulation amount φ of the modulated light P by magnetic resonance, a width w (=W1) of the partial metal film 6a, the wavelength λ of the modulated light P, and an effective refractive index $N_{gsp}$ of the laminated structure body 7. It is to be noted that m is an integer.

$$w \frac{2\pi}{\lambda} N_{gsp} = m\pi - \varphi \quad (1)$$

Figure 9:
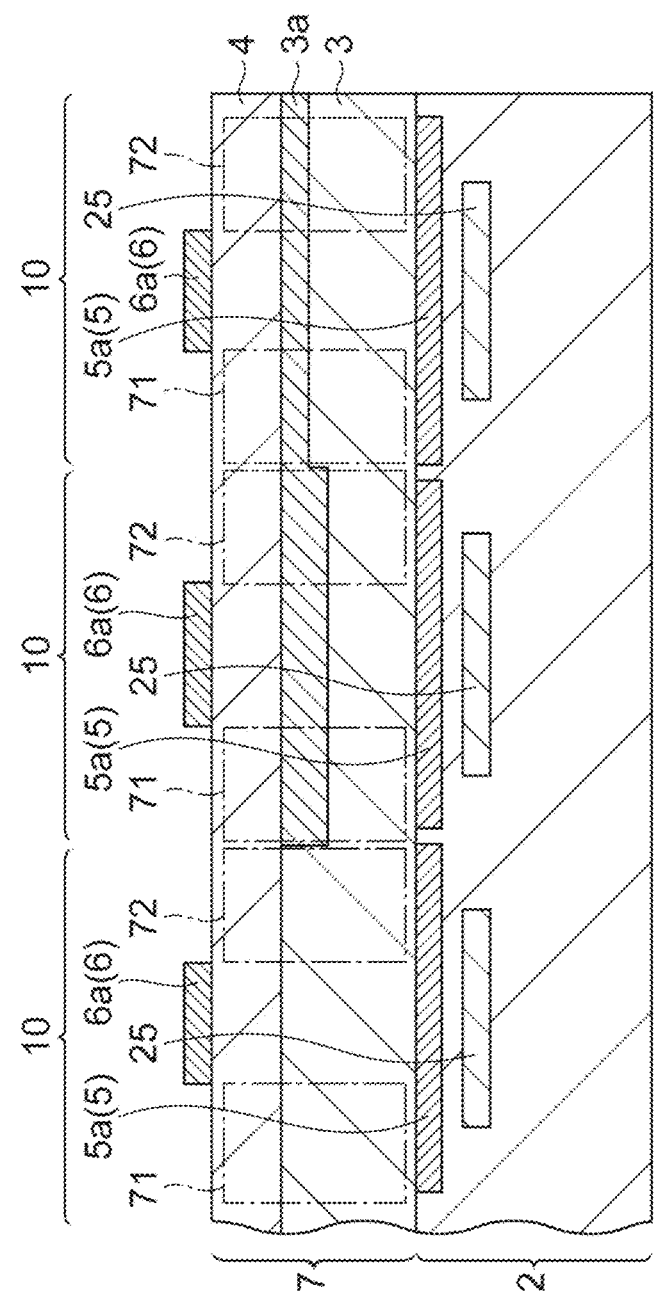
FIG. 9 is a view showing a state in which a metallized layer 3a is formed on a transparent conductive layer 3 by an electric field between a partial metal film 6a and the metal film 5.

As is clear from Expression (1), the phase modulation amount φ depends on the effective refractive index $N_{gsp}$ of the laminated structure body 7. Then, control of the effective refractive index $N_{gsp}$ is enabled by changing the drive voltage Vd applied between the partial metal film 6a and the metal film 5. The reason is as follows. When the drive voltage Vd is applied between the partial metal film 6a and the metal film 5, as shown in FIG. 9, the electric field between the partial metal film 6a and the metal film 5 increases the electron density near the interface of the transparent conductive layer 3 with the dielectric layer 4. As a result, a portion of the transparent conductive layer 3 near the interface changes to a metallized layer 3a. Since this layer 3a reacts with the modulated light P, the effective refractive index $N_{gsp}$ of the laminated structure body 7 changes.

Furthermore, in the metasurface 1A of the present embodiment, the metal film 5 includes the plurality of partial metal films 5a provided for each pixel 10 and separated from each other, and the drive circuit 2 individually controls the drive voltages Vd of the plurality of partial metal films 5a. Due to this, as shown in FIG. 9, the thickness of the metallized layer 3a in the transparent conductive layer 3 can be controlled independently for each pixel 10, and hence phase modulation independent for each pixel 10 becomes possible. That is, according to the metasurface 1A of the present embodiment, phase modulation can be performed in each of the plurality of two-dimensionally arrayed pixels 10.

Figure 10:
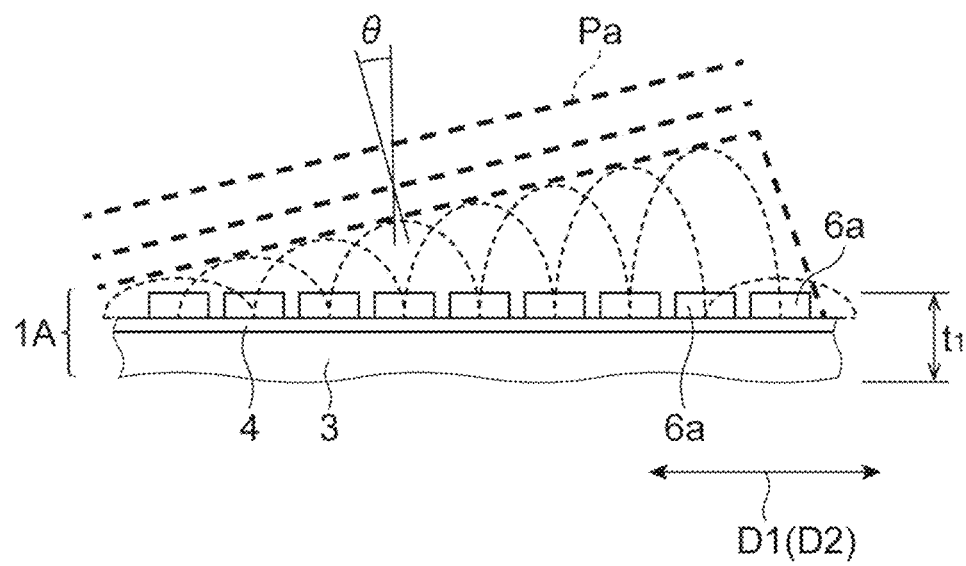
FIG. 10A is a view conceptually showing beam steering that can vary an exit angle of output light as a usage example of the metasurface 1A.
FIG. 10B is a cross-sectional view showing the shape of a light reflection surface 101 of a diffractive optical element (DOE) 100 having a structure for beam steering.
Figure 10:
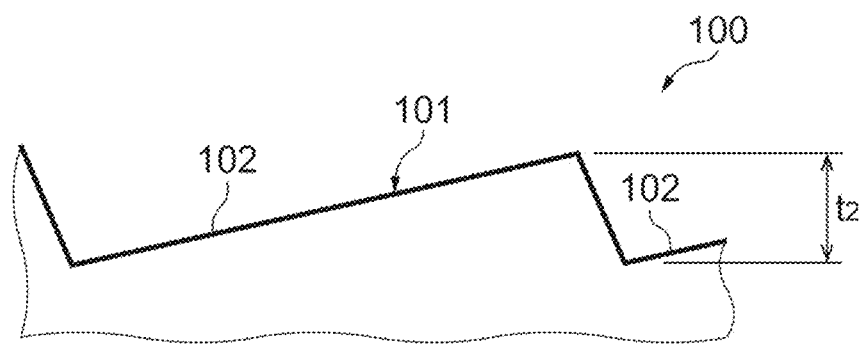

FIG. 10A is a view conceptually showing beam steering that can vary the exit angle of output light as a usage example of the metasurface 1A. In the example of FIG. 10A, by changing the phase modulation amount φ by a constant amount for each pixel 10 along the direction D1 (or direction D2), a wavefront Pa of the output light is tilted with respect to the surface of the metasurface 1A. At this time, an angle θ (i.e., exit angle of the output light) formed by the normal line of the wavefront Pa and the normal line of the surface of the metasurface 1A is determined according to the change amount of the phase modulation amount φ for each pixel 10. The larger the change amount is, the larger an exit angle θ of the output light becomes, and the smaller the change amount is, the smaller the exit angle θ of the output light becomes. Therefore, the exit angle θ of the output light can be set to an arbitrary angle by controlling the change amount of the phase modulation amount φ for each pixel 10.

FIG. 10B is a cross-sectional view showing the shape of a light reflection surface 101 of a diffractive optical element (DOE) 100 having a structure for beam steering. In the diffractive optical element 100, the light reflection surface 101 is provided with periodic unevenness, and a tilted surface 102 is formed on a protrusion portion, thereby enabling the exit angle of the output light (reflected light) to be controlled. However, in such configuration, the uneven structure of the light reflection surface 101 has a thickness $t_2$ of 200 μm, for example. On the other hand, the metasurface 1A of the present embodiment has a thickness $t_1$ of 50 nm, for example, and can be configured to be extremely thin as compared with the diffractive optical element 100. Therefore, the present embodiment can contribute to miniaturization of an apparatus including the metasurface 1A.

As in the present embodiment, the drive circuit 2 may have a plurality of voltage holding portions (capacitors 26) that hold voltage for each partial metal film 5a. This enables the sequential voltage setting for each partial metal film 5a with a simplified circuit configuration. It is possible at an arbitrary timing to set the voltage also for one or more arbitrarily selected partial metal films. In this case, the plurality of voltage holding portions may be capacitors 26 having the metal film 5 as one electrode. This allows the voltage holding portion to be realized by a simple configuration.

As in the present embodiment, the array direction of the pair of window regions 71 and 72 (in other words, the width direction of the partial metal film 6a) may coincide with the polarization direction P1 of the modulated light P. This allows surface plasmon to be preferably excited, and the phase of output light to be effectively controlled.

As in the present embodiment, the dielectric layer 4 may be located on the main surface 7a side with respect to the transparent conductive layer 3. This causes an accumulated layer reflecting the shape of the metal structure provided on the upper side to be formed, and hence it is expected that the electron concentration increases.

As in the present embodiment, the drive circuit 2 may include the plurality of transistors 25 provided for each pixel 10, the metasurface 1A may have the substrate having the plurality of transistors 25 on its main surface, and the substrate may be integrated with the laminated structure body 7 while causing its main surface and the back surface 7b to face each other. This makes it possible to provide a small-sized reflective dynamic metasurface with an incorporated drive circuit.

As in the present embodiment, the drive circuit 2 may set the metal film 6 to the reference potential, and the metal film 6 may extend over two or more pixels 10 arranged side by side in a direction intersecting with the array direction of the pair of window regions 71 and 72. This makes it possible to easily provide the metal film 6 with the reference potential while suppressing obstruction of the paths of the modulated light P and the output light by the wiring for providing the metal film 6 with the reference potential. Therefore, it is possible for the simple structure to suppress reduction in output efficiency of the metasurface 1A.

As in the present embodiment, the dielectric layer 4 may contain at least one of aluminum oxide, silicon oxide, and magnesium fluoride. This enables the dielectric layer 4 described above to be preferably realized.

As in the present embodiment, the transparent conductive layer 3 may include at least one of indium oxide and zinc oxide whose resistance is reduced by a dopant. This allows the operation of the transparent conductive layer 3 described above to be preferably achieved.

(First Variation)

Figure 11:
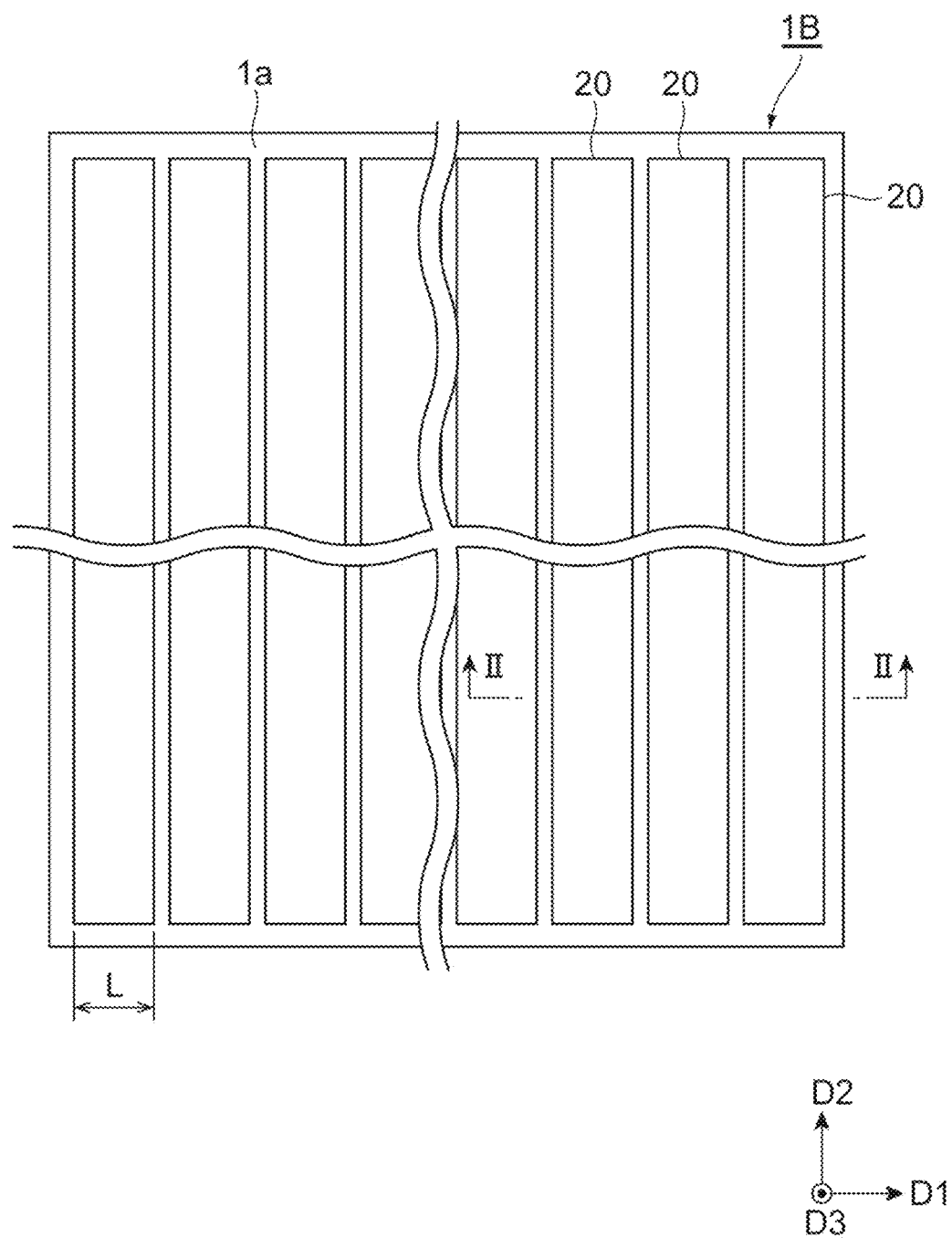
FIG. 11 is a plan view showing a metasurface 1B according to a first variation.

FIG. 11 is a plan view showing a metasurface 1B according to the first variation of the first embodiment. In place of the plurality of pixels 10 of the embodiment described above, a plurality (N) of pixels 20 are formed on the main surface 1a of the metasurface 1B. The plurality of pixels 20 constitute a one-dimensional array along the direction D1. The planar shape of each pixel 20 is a quadrilateral (e.g., a rectangle in which the direction D2 intersecting with the array direction is the longitudinal direction). A width L of each pixel 20 defined along the direction D1 is the same as the length L of one side of the pixel 10 of the embodiment described above. It is to be noted that the structure of the II-II cross section of the metasurface 1B is the same as that of the embodiment described above (see FIG. 2).

Figure 12:
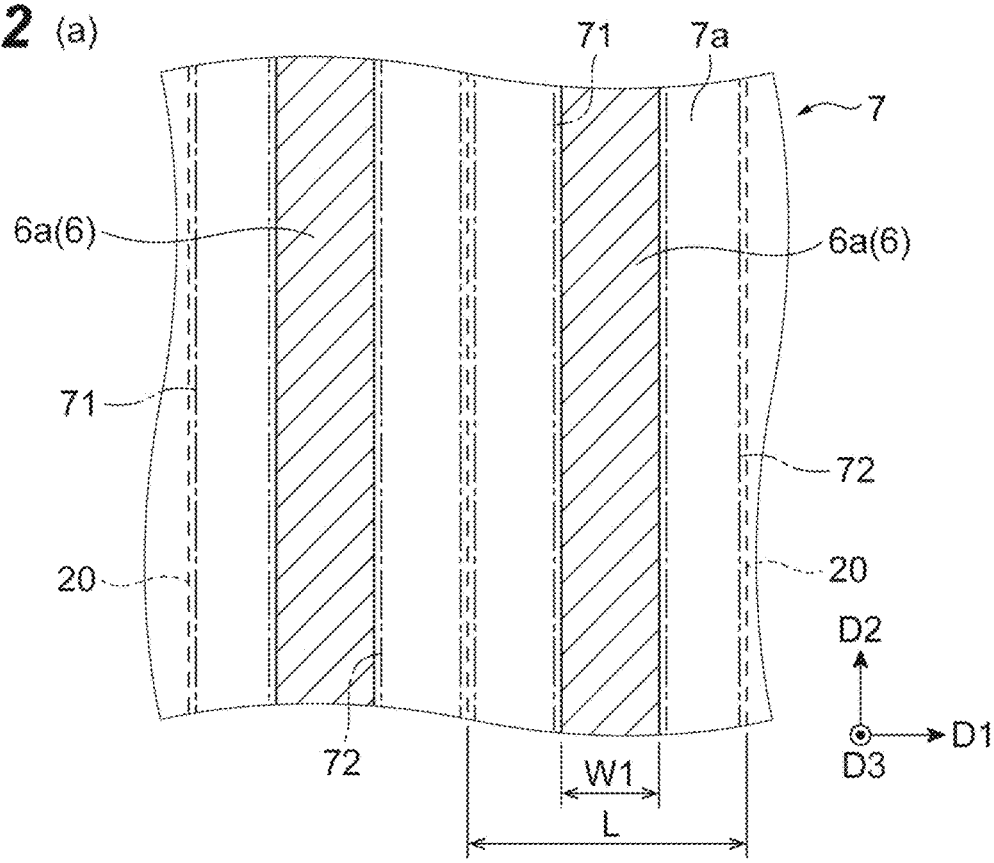
FIG. 12A is a view showing a planar shape of the metal film 6.
FIG. 12B is a view showing a planar shape of a metal film 5A.
Figure 12:
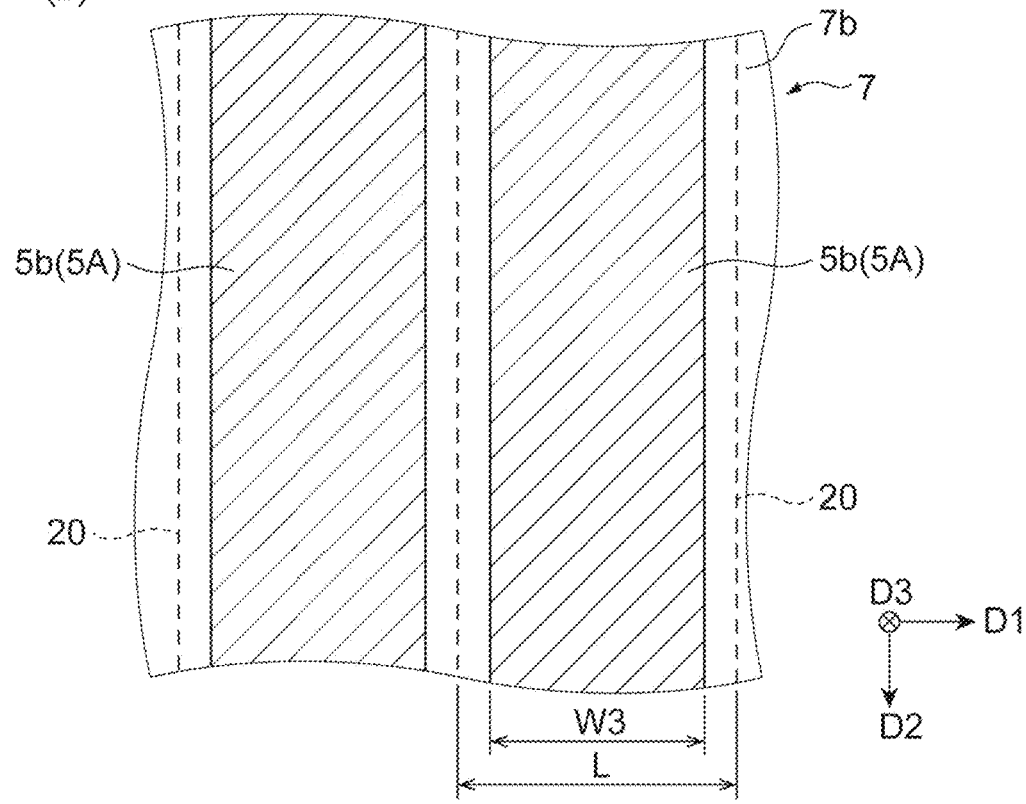

FIG. 12A is a view showing the planar shape of the metal film 6. The metal film 6 is provided on the main surface 7a of the laminated structure body 7 and, similarly to the embodiment described above, includes the plurality of partial metal films 6a. The plurality of partial metal films 6a are arranged side by side along the direction D1 and are separated from each other. The planar shape of each partial metal film 6a is a quadrilateral (e.g., a rectangle in which the direction D2 is the longitudinal direction). However, in the present embodiment, since the pixel 20 is also a rectangle whose longitudinal direction is the direction D2, each partial metal film 6a is provided for each pixel 20 and is located in each pixel 20. The width W1 of the partial metal film 6a defined along the direction D1 is the same as that in the embodiment described above. Also in the present variation, the width W1 of the partial metal film 6a is smaller than the length L of the pixel 10. Then, the partial metal film 6a is arranged at the substantially center of the pixel 20 along the direction D1. Therefore, the laminated structure body 7 includes the pair of window regions 71 and 72 in each pixel 20.

FIG. 12B is a view showing the planar shape of a metal film 5A. The metasurface 1B includes the metal film 5A in place of the metal film 5 of the embodiment described above. The metal film 5A is the second metal film in the present variation. The configuration of the metal film 5A is the same as that of the metal film 5 of the embodiment described above except the following points. That is, the metal film 5A of the present variation includes a plurality of partial metal films 5b. The plurality of partial metal films 5b are arranged side by side along the direction D1 and are separated from each other. The planar shape of each partial metal film 5b is a quadrilateral (e.g., a rectangle in which the direction D2 is the longitudinal direction). Each partial metal film 5b is provided for each pixel 20 and is located in each pixel 20. It is to be noted that a width W3 of each partial metal film 5b defined along the direction D1 (short direction) is the same as the length W2 of one side of the partial metal film 5a of the embodiment described above.

Figure 13:
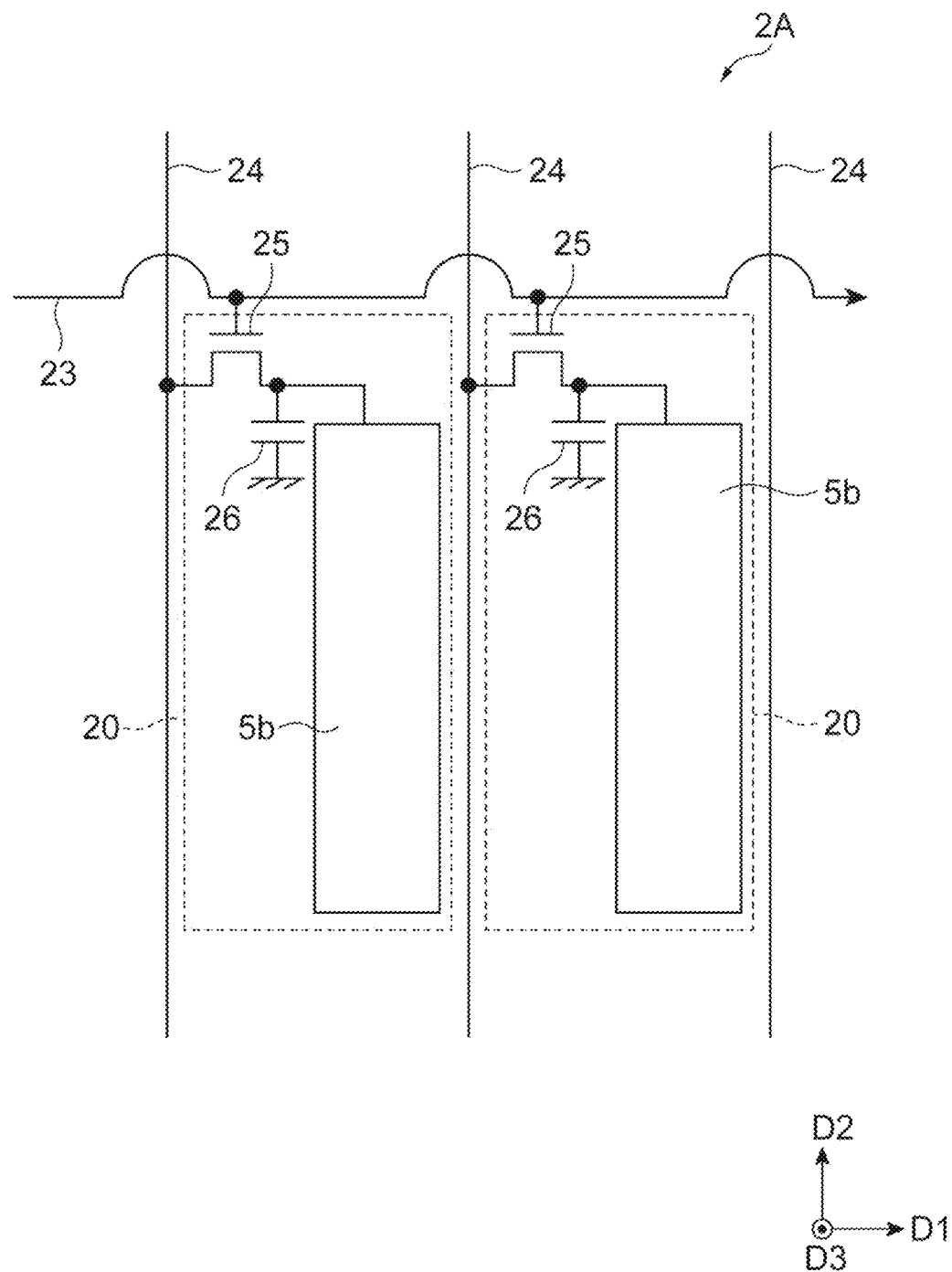
FIG. 13 is a view showing a configuration of a drive circuit 2A.

FIG. 13 is a view showing the configuration of the drive circuit 2A. The metasurface 1B includes a drive circuit 2A in place of the drive circuit 2 of the embodiment described above. The drive circuit 2A of the present variation has one gate drive wiring 23 and N voltage supply wirings 24. The gate drive wiring 23 extends along the alignment direction (direction D1) of the pixels 20. The N voltage supply wirings 24 each extend along a direction (direction D2) intersecting with the array direction of the pixels 20, and are arranged side by side along the direction D1. The gate drive wiring 23 is electrically connected with a control terminal (gate) of the transistor 25 provided for each pixel 20. The voltage supply wiring 24 of the n-th column (n=1, 2, ..., N) is electrically connected with one current terminal (e.g., source) of the transistor 25 provided on the pixel 20 located in the n-th column. The other current terminal (e.g., drain) of the transistor 25 is electrically connected with the partial metal film 5b of the pixel 20 via the wiring in the pixel 20.

The drive circuit 2A further has the plurality of capacitors 26 provided for each pixel 20. The capacitor 26 is an example of a voltage holding portion in the present variation, and holds, for each partial metal film 5b, a voltage applied to the partial metal film 5b of the pixel 20. It is to be noted that the specific configuration of the capacitor 26 is the same as that of the embodiment described above.

As in the present variation, the plurality of pixels may constitute a one-dimensional array. Even in such case, the same effects as those of the embodiment described above can be achieved.

(Second Variation)

Figure 14:
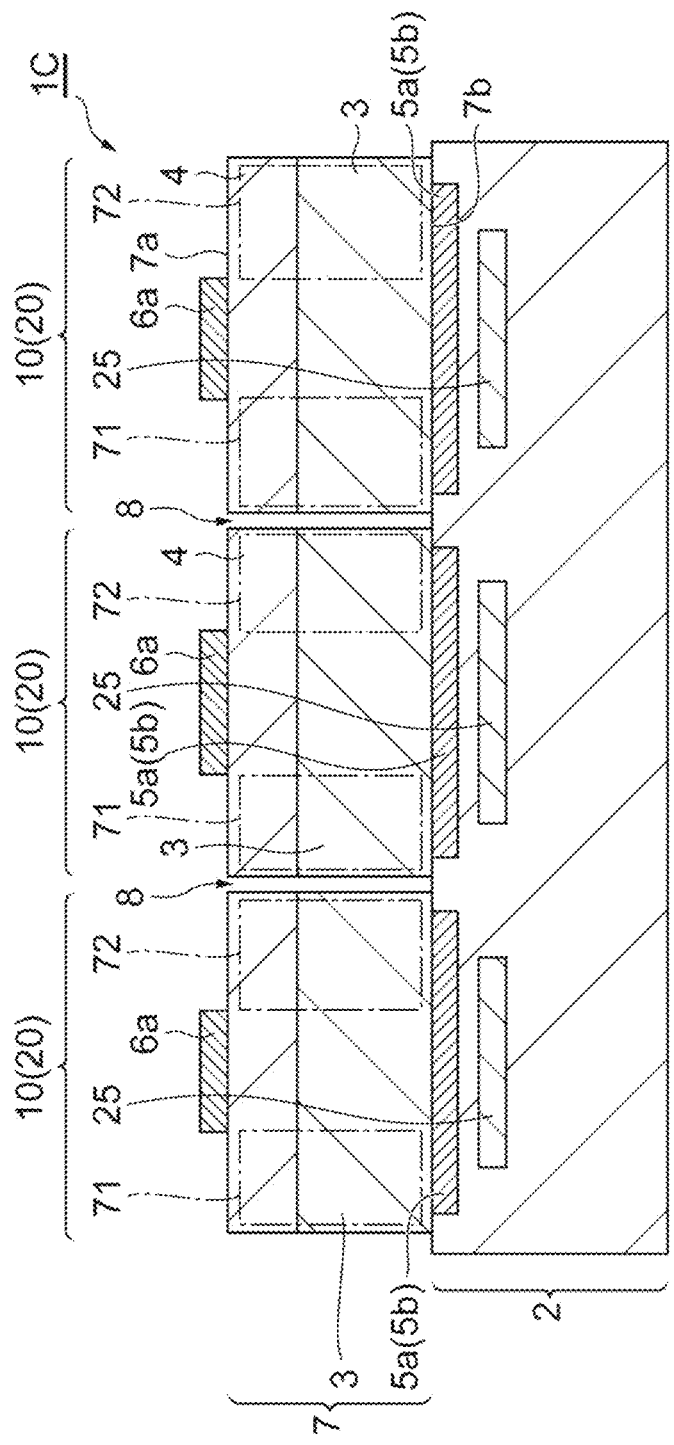
FIG. 14 is a view showing a cross-sectional structure of a metasurface 1C according to a second variation.

FIG. 14 is a view showing the cross-sectional structure of the metasurface 1C according to the second variation of the first embodiment. In the present variation, a gap 8 is provided between the laminated structure bodys 7 of the pixels 10 (or pixels 20) adjacent to each other, and the gap 8 spatially separates the laminated structure bodys 7 of the pixels 10 (or pixels 20) from each other. The gap 8 is provided for electrically separating the transparent conductive layers 3 in the pixels 10 (or pixels 20) adjacent to each other. Thus, when the drive voltage Vd is applied between the partial metal film 5a (5b) and the metal film 6 in a certain pixel 10 (or pixel 20), it is possible to prevent electrons from leaking to the transparent conductive layer 3 in the adjacent pixel 10 (or pixel 20), and hence it is possible to reduce crosstalk between the pixels 10 (or pixels 20) adjacent to each other. It is to be noted that when the gap 8 is formed, it is preferable that a mask having an opening corresponding to the gap 8 is formed on the laminated structure body 7, and the laminated structure body 7 is etched through the mask.

Figure 15:
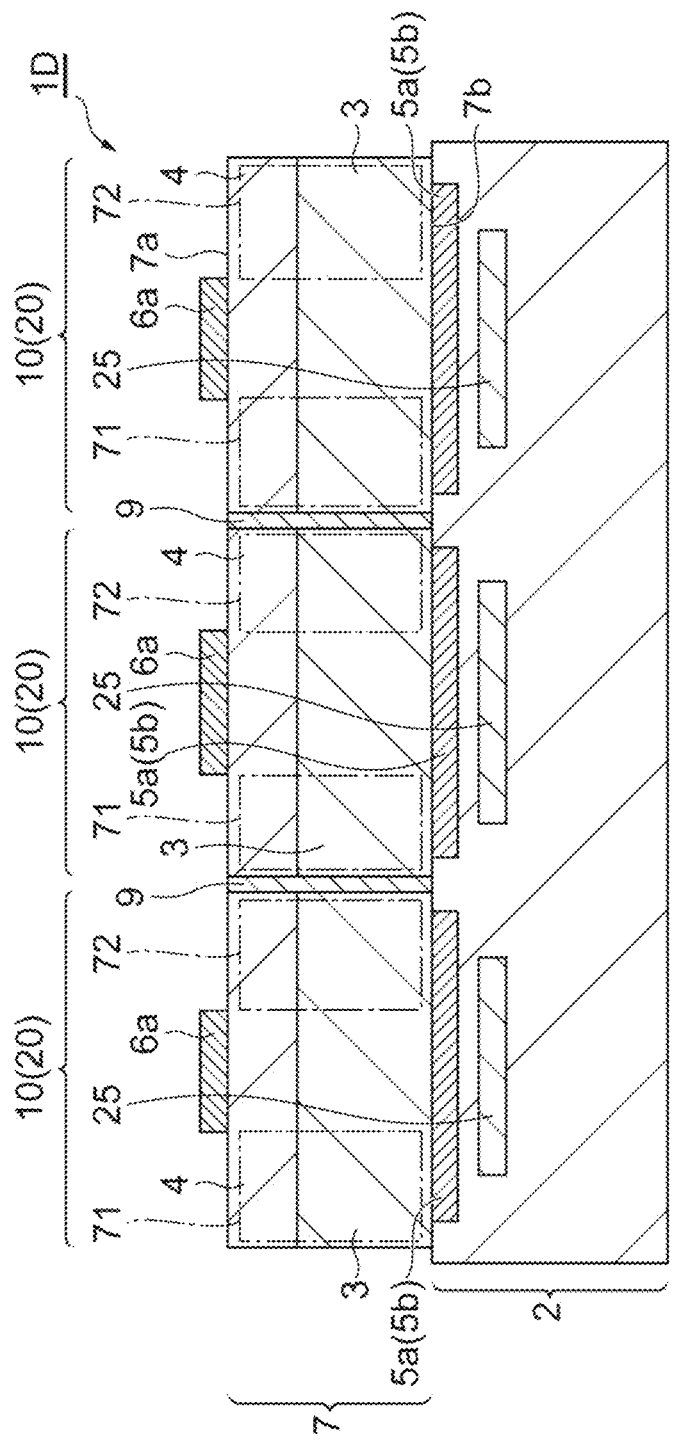
FIG. 15 is a view showing a cross-sectional structure of a metasurface 1D according to yet another variation.

FIG. 15 is a view showing the cross-sectional structure of the metasurface 1D according to yet another variation. In this example, in place of the above-described gap 8, an insulation portion 9 is provided between the laminated structure bodys 7 in the pixels 10 (or pixels 20) adjacent to each other. The insulation portion 9 mainly contains an insulating material such as $SiO_2$ and $Si_3N_4$. Even with such configuration, it is possible to effectively reduce crosstalk between the pixels 10 (or the pixels 20) adjacent to each other. It is to be noted that after the gap 8 described above is formed in the laminated structure body 7, the insulation portion 9 is preferably formed by embedding the gap 8 with an insulating material.

Second Embodiment

Figure 16:
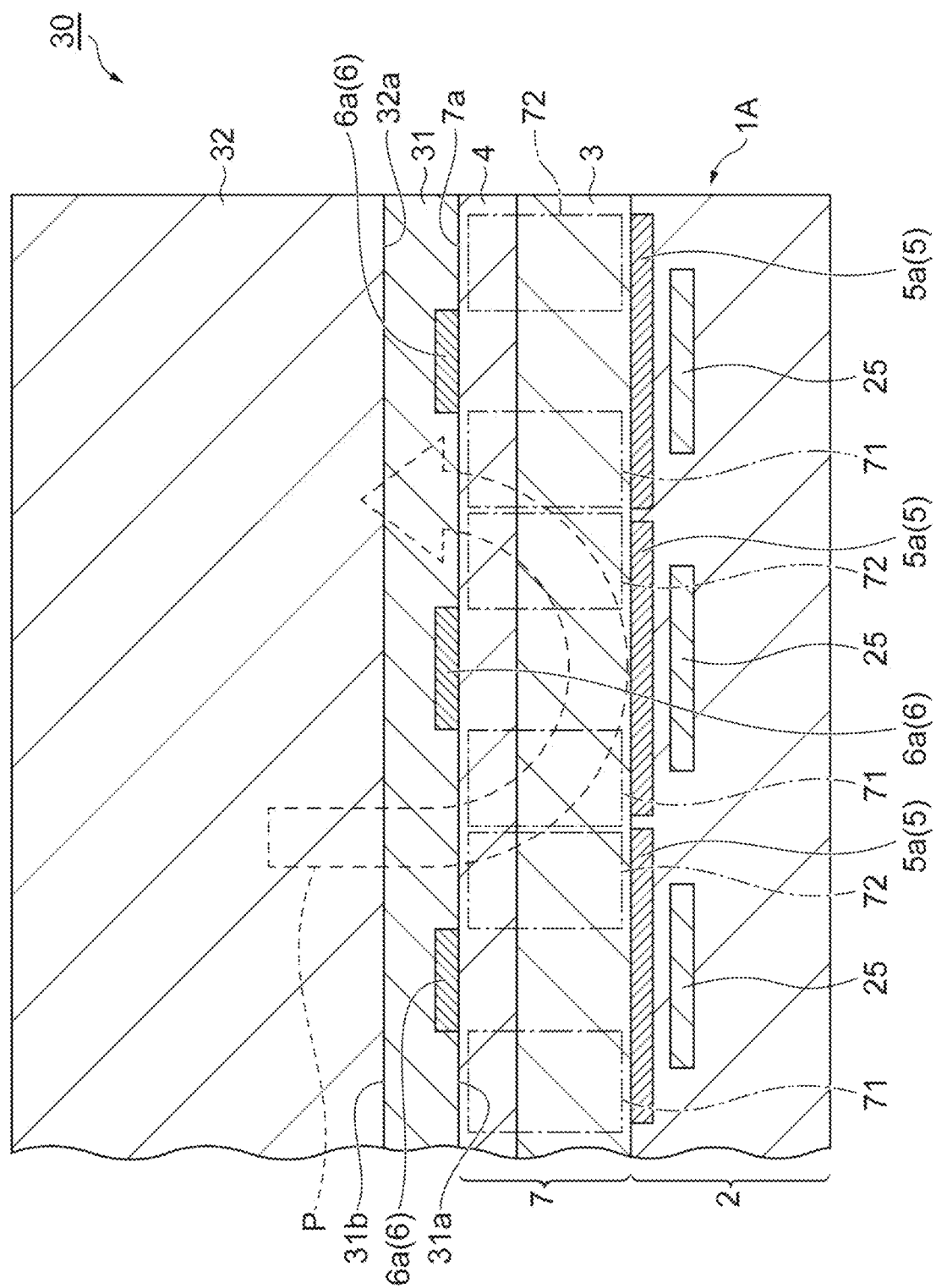
FIG. 16 is a cross-sectional view showing a configuration of a light-emitting apparatus 30 according to a second embodiment of the present disclosure.

FIG. 16 is a cross-sectional view showing the configuration of a light-emitting apparatus 30 according to the second embodiment of the present invention. The light-emitting apparatus 30 of the present embodiment includes the metasurface 1A of the first embodiment, the light guide layer 31, and a surface emitting element 32. The surface emitting element 32 is a surface emitting type semiconductor light-emitting element such as a vertical cavity surface emitting laser (VCSEL) or a photonic crystal surface emitting laser (PCSEL). The surface emitting element 32 has a light-emitting surface 32a that outputs light, and is arranged on the metasurface 1A so that the light-emitting surface 32a and the main surface 7a of the laminated structure body 7 face each other.

The light guide layer 31 is provided between the metasurface 1A and the surface emitting element 32, and reduces optical loss between the metasurface 1A and the surface emitting element 32. The light guide layer 31 has a surface 31a on the metasurface 1A side and a surface 31b on the surface emitting element 32 side. The surface 31a is in contact with the main surface 7a of the laminated structure body 7, and the surface 31b is in contact with the light-emitting surface 32a of the surface emitting element 32. The plurality of partial metal films 6a of the metal film 6 provided on the main surface 7a are embedded in the light guide layer 31. The refractive index of the light guide layer 31 is the same as or smaller than the refractive index of the layer (dielectric layer 4 in the present embodiment) constituting the main surface 7a of the laminated structure body 7. Due to this, the light P outputted from the light-emitting surface 32a is inputted from the light guide layer 31 to the laminated structure body 7 with low loss. The light guide layer 31 is composed of a dielectric, for example. When the dielectric layer 4 mainly contains $Al_2O_3$, the light guide layer 31 mainly contains at least one of $Al_2O_3$, $SiO_2$, $MgF_2$, and $CaF_2$, for example. When the dielectric layer 4 mainly contains $SiO_2$, the light guide layer 31 mainly contains at least one of $SiO_2$, $MgF_2$, and $CaF_2$. When the dielectric layer 4 mainly contains $MgF_2$, the light guide layer 31 mainly contains at least one of $MgF_2$ and $CaF_2$.

In the present embodiment, when the light P is outputted from the light-emitting surface 32a of the surface emitting element 32, the light P passes through the light guide layer 31 and is inputted to the main surface 7a of the laminated structure body 7. Then, due to the same operation as that of the first embodiment, the metasurface 1A modulates the phase of the light P for each pixel. The modulated light P passes through the light guide layer 31 again and returns to the surface emitting element 32, and is outputted towards the outside of the light-emitting apparatus 30 from a surface of the surface emitting element 32 opposite to the light-emitting surface 32a.

According to the light-emitting apparatus 30 of the present embodiment, the same effects as those of the first embodiment can be achieved by including the metasurface 1A of the first embodiment. In addition, since the metasurface 1A and the surface emitting element 32 are configured integrally, it is possible to omit an optical system such as a lens, as compared with the case where the metasurface 1A and the surface emitting element 32 are configured separately. Therefore, it is possible to simplify the configuration of the light-emitting apparatus, and to omit the work of adjusting the optical system.

The reflective dynamic metasurface according to the embodiment of the present disclosure is not limited to the above-described embodiments, and various other variations can be made. For example, the above-described embodiments and variations have a configuration in which the drive circuit, the laminated structure body, and the first metal film and the second metal film are integrated. However, in the present disclosure, the drive circuit, the laminated structure body, and the first metal film and the second metal film may be configured separately from one another. In the above-described embodiments and variations, the second metal film provided on the surface opposite to the surface to which the modulated light is inputted has a plurality of partial metal films provided for each pixel and separated from each other. However, the first metal film provided on the surface to which the modulated light is inputted may have a plurality of partial metal films provided for each pixel and separated from each other. Alternatively, both the first metal film and the second metal film may have a plurality of partial metal films provided for each pixel and separated from each other. With any configuration, the same effects as those of the above-described embodiments and variations can be achieved.

REFERENCE SIGNS LIST 1A, 1B, 1C, 1D . . . Metasurface; 1a . . . Main surface; 2, 2A . . . Drive circuit; 3 . . . Transparent conductive layer; 3a . . . Metallized layer; 4 . . . Dielectric layer; 5, 5A, 6 . . . Metal film; 5a, 5b, 6a . . . Partial metal film; 7 . . . Laminated structure body; 7a . . . Main surface; 7b . . . Back surface; 8 . . . Gap; 9 . . . Insulation portion; 10, 20 . . . Pixel; 21 . . . Semiconductor layer; 21a, 21b . . . Semiconductor region; 21c . . . Surface; 23 . . . Gate drive wiring; 24 . . . Voltage supply wiring; 25 . . . Transistor; 25a . . . Gate electrode; 25b . . . Source electrode; 25c . . . Drain electrode; 25d . . . Wiring; 26 . . . Capacitor; 27, 28 . . . Insulation layer; 29 . . . Dielectric layer; 30 . . . Light-emitting apparatus; 31 . . . Light guide layer; 32 . . . Surface emitting element; 32a . . . Light-emitting surface; 71, 72 . . . Window region; P . . . Modulated light; P1 . . . Polarization direction; Pa . . . Wavefront; Vd . . . Drive voltage; Vg . . . Gate voltage; and θ . . . Exit angle.

The invention claimed is:

1. A reflective dynamic metasurface, comprising:
   a laminated structure body including a first surface through which light with a predetermined wavelength can pass in both directions, a second surface opposing the first surface, a transparent conductive layer having transmittivity to the light and arranged between the first surface and the second surface, and a dielectric layer having transmittivity to the light and arranged between the first surface and the second surface, the laminated structure body in which a pixel region is set, the pixel region including at least a plurality of pixels constituting a one-dimensional array when the first surface is viewed along a lamination direction from the first surface to the second surface;
   a first metal film disposed on the first surface of the laminated structure body;
   a second metal film disposed on the second surface of the laminated structure body so as to sandwich the plurality of pixels together with the first metal film, the second metal film reflecting, towards the first surface, the light passing through the first surface; and a drive circuit configured to control voltage applied between the first metal film and the second metal film, wherein the first metal film is disposed on the first surface so that a pair of window regions separated from each other in a state of sandwiching at least a part of the first metal film are exposed in each of the plurality of pixels when the first surface is viewed along the lamination direction, at least the second metal film includes a plurality of partial metal films each defining a barycentric position and a shape of the associated pixel of the plurality of pixels on the second surface, the plurality of partial metal films are disposed on the second surface in a state of being separated from each other by a predetermined distance and electrically separated from each other, and the drive circuit has a structure in which potentials of at least the plurality of partial metal films corresponding one-to-one to the plurality of pixels are individually controlled, in order to modulate a phase of the light for each of the plurality of pixels, wherein the laminated structure body further has a gap or an insulation portion arranged between pixels adjacent to each other of the plurality of pixels, the gap or the insulation portion electrically separating, from each other, adjacent portions each constituting a part of the transparent conductive layer and each constituting a part of the adjacent pixel.

2. The reflective dynamic metasurface according to claim 1, wherein the drive circuit includes a plurality of voltage holding portions disposed so as to correspond one-to-one to the plurality of partial metal films, the plurality of voltage holding portions each holding voltage for setting potential of the associated partial metal film of the plurality of partial metal films.

3. The reflective dynamic metasurface according to claim 2, wherein each of the plurality of voltage holding portions includes a capacitor in which one electrode is constituted with the associated partial metal film of the plurality of partial metal films.

4. The reflective dynamic metasurface according to claim 1, wherein the drive circuit has a plurality of transistors disposed so as to correspond one-to-one to the plurality of partial metal films.

5. The reflective dynamic metasurface according to claim 1, wherein the dielectric layer is located between the first surface and the transparent conductive layer.

6. The reflective dynamic metasurface according to claim 1, further comprising a substrate having a main surface on which the drive circuit is arranged, wherein the substrate is integrated with the laminated structure body in a state where the main surface and the second surface of the laminated structure body face each other.

7. The reflective dynamic metasurface according to claim 1, wherein the drive circuit sets the first metal film to a reference potential, and the first metal film extends over two or more pixels arranged side by side along a direction intersecting with an array direction of the pair of window regions.

8. The reflective dynamic metasurface according to claim 1, wherein the dielectric layer contains at least one of aluminum oxide, silicon oxide, and magnesium fluoride.

9. The reflective dynamic metasurface according to claim 1, wherein the transparent conductive layer includes at least one of indium oxide and zinc oxide as an oxide whose resistance is reduced by a dopant.

10. A reflective dynamic metasurface, comprising:

a laminated structure body including a first surface through which light with a predetermined wavelength can pass in both directions, a second surface opposing the first surface, a transparent conductive layer having transmittivity to the light and arranged between the first surface and the second surface, and a dielectric layer having transmittivity to the light and arranged between the first surface and the second surface, the laminated structure body in which a pixel region is set, the pixel region including at least a plurality of pixels constituting a one-dimensional array when the first surface is viewed along a lamination direction from the first surface to the second surface;

a first metal film disposed on the first surface of the laminated structure body;

a second metal film disposed on the second surface of the laminated structure body so as to sandwich the plurality of pixels together with the first metal film, the second metal film reflecting, towards the first surface, the light passing through the first surface; and a drive circuit configured to control voltage applied between the first metal film and the second metal film, wherein the first metal film is disposed on the first surface so that a pair of window regions separated from each other in a state of sandwiching at least a part of the first metal film are exposed in each of the plurality of pixels when the first surface is viewed along the lamination direction, at least the second metal film includes a plurality of partial metal films each defining a barycentric position and a shape of the associated pixel of the plurality of pixels on the second surface, the plurality of partial metal films are disposed on the second surface in a state of being separated from each other by a predetermined distance and electrically separated from each other, the drive circuit has a structure in which potentials of at least the plurality of partial metal films corresponding one-to-one to the plurality of pixels are individually controlled, in order to modulate a phase of the light for each of the plurality of pixels, and an array direction of the pair of window regions on the first surface coincides with a polarization direction of the light.

11. The reflective dynamic metasurface according to claim 10, wherein the drive circuit includes a plurality of voltage holding portions disposed so as to correspond one-to-one to the plurality of partial metal films, the plurality of voltage holding portions each holding voltage for setting potential of the associated partial metal film of the plurality of partial metal films.

12. The reflective dynamic metasurface according to claim 11, wherein each of the plurality of voltage holding portions includes a capacitor in which one electrode is constituted with the associated partial metal film of the plurality of partial metal films.

13. The reflective dynamic metasurface according to claim 10, wherein the drive circuit has a plurality of transistors disposed so as to correspond one-to-one to the plurality of partial metal films.

14. The reflective dynamic metasurface according to claim 10, wherein the dielectric layer is located between the first surface and the transparent conductive layer.

15. The reflective dynamic metasurface according to claim 10, further comprising a substrate having a main surface on which the drive circuit is arranged, wherein
the substrate is integrated with the laminated structure body in a state where the main surface and the second surface of the laminated structure body face each other.

16. The reflective dynamic metasurface according to claim 10, wherein the drive circuit sets the first metal film to a reference potential, and
the first metal film extends over two or more pixels arranged side by side along a direction intersecting with an array direction of the pair of window regions.

17. The reflective dynamic metasurface according to claim 10, wherein the dielectric layer contains at least one of aluminum oxide, silicon oxide, and magnesium fluoride.

18. The reflective dynamic metasurface according to claim 10, wherein the transparent conductive layer includes at least one of indium oxide and zinc oxide as an oxide whose resistance is reduced by a dopant.

* * * * *